(12) United States Patent
Uddin et al.

(10) Patent No.: US 12,424,950 B2
(45) Date of Patent: Sep. 23, 2025

(54) SELF-SUSTAINABLE TRIBOELECTRIC ENERGY CASE FOR POWERING DEVICES

(71) Applicant: The Board of Regents of The University of Texas System, Austin, TX (US)

(72) Inventors: Mohammed Jasim Uddin, Edinburg, TX (US); Abu Musa Abdullah, Edinburg, TX (US); Alejandro Flores, Edinburg, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 0 days.

(21) Appl. No.: 18/893,552

(22) Filed: Sep. 23, 2024

(65) Prior Publication Data
US 2025/0015731 A1 Jan. 9, 2025

Related U.S. Application Data

(63) Continuation of application No. 17/520,523, filed on Nov. 5, 2021, now Pat. No. 12,101,040.
(Continued)

(51) Int. Cl.
*H02N 1/04* (2006.01)
*H04B 1/3888* (2015.01)

(52) U.S. Cl.
CPC ............. *H02N 1/04* (2013.01); *H04B 1/3888* (2013.01)

(58) Field of Classification Search
CPC ................................ H02N 1/04; H04B 1/3888
See application file for complete search history.

(56) References Cited

U.S. PATENT DOCUMENTS

| | | |
|---|---|---|
| 6,977,479 B2 | 12/2005 | Hsu |
| 8,044,942 B1 | 10/2011 | Leonhard et al. |
| (Continued) | | |

FOREIGN PATENT DOCUMENTS

CN 212381254 U * 1/2021

OTHER PUBLICATIONS

CN-212381254-U_translate (Year: 2021).*
(Continued)

*Primary Examiner* — Tulsidas C Patel
*Assistant Examiner* — Mohammed Ahmed Qureshi
(74) *Attorney, Agent, or Firm* — Munck Wilson Mandala LLP; Denise Mayfield

(57) ABSTRACT

A power and/or electricity generating source and/or component that is TENG-based, and that may be configured as an assembly and/or component for powering one or more electronic devices, is disclosed, a case, carrier or other carrying container, for example a case for a cell phone, ipad, electronic tablet, personal computer, or any similar device, that provides an electricity source to power the cell phone, ipad, electronic tablet, is disclosed. The energy generating carriers and/or containers and configurations thereof, also provide an electricity energy storage source, such as a capacitor. This electronic energy storage source may be incorporated within an electronic device itself, or may be incorporated within the case and/or covering. A bridge rectifier is also provided in some embodiments of the case. Upon walking or touching a surface of an electronic device, the power generating source will harness mechanical energy, and provide for the generation of electricity with the one or more TENG components (TESTEC) that comprise the energy generating unit. Metal particles (silver, copper, etc. nanoparticles) incorporated within and/or on polymeric layers and/or a film of the carrier and/or container assembly, are
(Continued)

also provided, and provide for enhanced energy generating capacity of the energy generating and storage components described.

16 Claims, 7 Drawing Sheets

Related U.S. Application Data

(60) Provisional application No. 63/110,289, filed on Nov. 5, 2020.

(56) References Cited

U.S. PATENT DOCUMENTS

| | | |
|---|---|---|
| 2011/0216020 A1 | 9/2011 | Lee et al. |
| 2017/0359001 A1* | 12/2017 | Wang .................. C23C 16/045 |

OTHER PUBLICATIONS

E. Ozdalga, A. Ozdalga, N. Ahuja, The smartphone in medicine: a review of current and potential use among physicians and students, J. Med. Internet Res., 14 (2012), p. e128, 10.2196/jmir.1994.
Technology in Our Life Today and How it Has Changed, AgingInPlace. Org (Nov. 17, 2021).
N. Espinosa, M. Hosel, D. Angmo, F.C. Krebs, Solar cells with one-day energy payback for the factories of the future, Energy Environ. Sci., 5 (2012), pp. 5117-5132, 10.1039/c1ee02728J.
L. Lin, S. Wang, S. Niu, C. Liu, Y. Xie, Z.L. Wang, Noncontact free-rotating disk triboelectric nanogenerator as a sustainable energy harvester and self-powered mechanical sensor, ACS Appl. Mater. Interfaces, 6 (2014), pp. 3031-3038, 10.1021/am405637s.
E. Kocak, A. Şarkguensei, The renewable energy and economic growth nexus in Black Sea and Balkan countries, Energy Pol., 100 (2017), pp. 51-57, 10.1016/j.enpol.2016.10.007.
A.M. Abdullah, A.R. Chowdhury, Y. Yang, H. Vasquez, H.J. Moore, J.G. Parsons, K. Lozano, J.J. Gutierrez, K.S. Martirosyan, M.J. Uddin, Tailoring the viscosity of water and ethylene glycol based TiO2 nanofluids, J. Mol. Liq., 297 (2020), p. 111982, 10.1016/j.molliq.2019.111982.
M. Ma, Z. Kang, Q. Liao, Q. Zhang, F. Gao, X. Zhao, Z. Zhang, Y. Zhang, Development, applications, and future directions of triboelectric nanogenerators, Nano Res, 11 (2018), pp. 2951-2969, 10.1007/s12274-018-1997-9.
F.-R. Fan, Z.-Q. Tian, Z Lin Wang, Flexible triboelectric generator!, Nanomater. Energy, 1 (2012), pp. 328-334, 10.1016/j.nanoen.2012.01.004.
S. Wang, Z.L. Wang, Y. Yang, A One-Structure-Based Hybridized Nanogenerator for Scavenging Mechanical and Thermal Energies by Triboelectric-Piezoelectric-Pyroelectric Effects, Adv. Mater., 28 (2016), pp. 2881-2887, 10.1002/adma.201505684.
Y. Zi, L. Lin, J. Wang, S. Wang, J. Chen, X. Fan, P.-K. Yang, F Yi, Z.L. Wang, Triboelectric-pyroelectric-Piezoelectric hybrid cell for high-efficiency energy-harvesting and self-powered sensing, Adv. Mater., 27 (2015), pp. 2340-2347, 10.1002/adma.201500121.
R.K. Gupta, Q. She, L. Dhakar, T. Wang, C.H. Heng, C. Lee, Broadband energy harvester using non-linear polymer spring and electromagnetic/triboelectric hybrid mechanism, Sci. Rep., 7 (2017), p. 41396 (13 pgs.), 10.1038/srep41396.
A.R. Chowdhurg, J. Jaksik, I. Hussain, P. Tran, S. Danti, M.J. Uddin, Surface modified nanostructured piezoelectric device as a cost-effective transducer for energy and biomedicine, Energy Technol., 7 (1800767), (8 pgs.), (2019), 10.1002/ente.201800767.
C. Wu, A.C. Wang, W. Ding, H. Guo, Z.L. Wang, Triboelectric nanogenerator: a foundation of the energy for the new era, Advanced Energy Materials, 9 (2019), p. 1802906 (25 pgs.), 10.1002/aenm.201802906.
S. Wang, L. Lin, Z.L. Wang, Triboelectric nanogenerators as self-powered active sensors, Nanomater. Energy, 11 (2015), pp. 436-462, 10.1016/j.nanoen.2014.10.034 [18].

Z.L. Wang, J. Song, Piezoelectric Nanogenerators Based on Zinc Oxide Nanowire Arrays, Science, vol. 312 (2006), pp. 242-246, 10.1126/science.1124005.
F. Yi, L. Lin, S. Niu, P.K. Yang, Z. Wang, J. Chen, Y. Zhou, Y. Zi, J. Wang, Q. Liao, Y. Zhang, Z.L. Wang, Stretchable-rubber-based triboelectric nanogenerator and its application as self-powered body motion sensors, Adv. Funct. Mater., 25 (2015), pp. 3688-3696, 10.1002/adfm.201500428.
F. Hu, Q. Cai, F. Liao, M. Shao, S.-T. Lee, Recent advancements in nanogenerators for energy harvesting, Small, 11 (2015), No. 42, pp. 5611-5628, 10.1002/smll.201501011.
M.A.P. Mahmud, N. Huda, S.H. Farjana, M. Asadnia, C. Lang, Recent advances in nanogenerator-driven self-powered implantable biomedical devices, Advanced Energy Materials, 8 (2017), p. 1701210 (25 pgs.), 10.1002/aenm.201701210.
Z. Lou, L. Li, L. Wang, G. Shen, Recent progress of self-powered sensing systems for wearable electronics, Small, 13 (2017), p. 1701791 (27 pgs.), 10.1002/smll.201701791.
Y. Zi, H. Guo, Z. Wen, M.-H. Yeh, C. Hu, Z.L. Wang, Harvesting low-frequency (<5 Hz) irregular mechanical energy: a possible killer application of triboelectric nanogenerator, ACS Nano, 10 (2016), pp. 4797-4805, 10.1021/acsnano.6b01569.
W. Tang, T. Jiang, F.R. Fan, A.F. Yu, C. Zhang, X. Cao, Z.L. Wang, Liquid-Metal Electrode for High Performance Triboelectric Nanogenerator at an Instantaneous Energy Conversion Efficiency of 70.6%, Advanced Functional Materials. 25 (2015) 3718-3725 (8 pgs.), https://doi.org/10.1002/adfm.201501331.
E. Jovanov, A. Milenkovic, C. Otto, P.C. de Groen, A wireless body area network of intelligent motion sensors for computer assisted physical rehabilitation, J. NeuroEng. Rehabil., 2 (2005), p. 6 (10 pgs.), 10.1186/1743-0003-2-6.
S. Niu, X. Wang, F. Yi, Y.S. Zhou, Z.L. Wang, A universal self-charging system driven by random biomechanical energy for sustainable operation of mobile electronics Nat. Commun., 6 (2015), p. 8975 (8 pgs.), 10.1038/ncomms9975.
Y. Wang, Y. Yang, Z.L. Wang, Triboelectric nanogenerators as flexible power sources, Npj Flexible Electronics, 1 (2017), p. 10 (10 pgs.), 10.1038/s41528-017-0007-8.
Y. Mao, N. Zhang, Y. Tang, M. Wang, M. Chao, E. Liang, A paper triboelectric nanogenerator for self-powered electronic systems, Nanoscale, 9 (2017), pp. 14499-14505, 10.1039/C7NR05222G.
X. Pu, L. Li, H. Song, C. Du, Z. Zhao, C. Jiang, G. Cao, W. Hu, Z.L. Wang, A self-charging power unit by integration of a textile triboelectric nanogenerator and a flexible lithium-ion battery for wearable electronics, Adv. Mater., 27 (2015), pp. 2472-2478, 10.1002/adma.201500311.
J. Wang, X. Li, Y. Zi, S. Wang, Z. Li, L. Zheng, F. Yi, S. Li, Z.L. Wang, A Flexible Fiber-Based Supercapacitor-Triboelectric-Nanogenerator Power System for Wearable Electronics, Advanced Materials. 27 (2015) pp. 4830-4836. https://doi.org/10.1002/adma.201501934.
W. Liu, Z. Wang, G. Wang, G. Liu, J. Chen, X. Pu, Y. Xi, X. Wang, H. Guo, C. Hu, Z.L. Wang, Integrated charge excitation triboelectric nanogenerator, Nat. Commun., 10 (2019), p. 1426 (9 pgs.), 10.1038/s41467-019-09464-8.
X. Wang, B. Yang, J. Liu, Y. Zhu, C. Yang, Q. He, A flexible triboelectric-piezoelectric hybrid nanogenerator based on P(VDF-TrFE) nanofibers and PDMS/MWCNT for wearable devices, Scientific Rep., 6 (2016), p. 36409 (10 pgs.), 10.1038/srep36409.
J. Xiong, P. Cui, X. Chen, J. Wang, K. Parida, M.-F. Lin, P.S. Lee, Skin-touch-actuated textile-based triboelectric nanogenerator with black phosphorus for durable biomechanical energy harvesting, Nat. Commun., 9 (2018), p. 4280 (10 pgs.), 10.1038/s41467-018-06759-0.
G. Zhu, R Bai, J. Chen, Z. Lin Wang, Power-generating shoe insole based on triboelectric nanogenerators for self-powered consumer electronics, Nanomater. Energy, 2 (2013), pp. 688-692, 10.1016/j.nanoen.2013.08.002.
Q. Liang, X. Yan, Y. Gu, K. Zhang, M. Liang, S. Lu, X. Zheng, Y. Zhang, Highly transparent triboelectric nanogenerator for harvesting water-related energy reinforced by antireflection coating, Sci. Rep., 5 (2015), p. 9080 (7 pgs.), 10.1038/srep09080.

(56) References Cited

OTHER PUBLICATIONS

S. Kim, M. K. Gupta, K. Y. Lee, A. Sohn, T. Y. Kim, K.-S. Shin, D. Kim, S. K. Kim, K. H. Lee, H.-J. Shin, D.-W. Kim, S.-W. Kim, Transparent Flexible Graphene Triboelectric Nanogenerators, Advanced Materials, 2014, vol. 26, pp. 3918-3925 (8 pgs.), doi:10.1002/adma.201400172.
K.Y. Lee, M.K. Gupta, S.-W. Kim, Transparent flexible stretchable piezoelectric and triboelectric nanogenerators for powering portable electronics, Nano Energy. 14 (2015) pp. 139-160. https://dx.doi.org/10.1016/j.nanoen.2014.11.009.
Y. Hwan Ko, S. Hyun Lee, J. Woo Leem, J. Su Yu, High transparency and triboelectric charge generation properties of nano-patterned PDMS, RSC Adv., 4 (2014), pp. 10216-10220, 10.1039/C3RA47199C.
N. Kaur, J. Bahadur, V. Panwar, P. Singh, K. Rathi, K. Pal, Effective energy harvesting from a single electrode based triboelectric nanogenerator, Sci. Rep., 6 (2016), p. 38835 (19 pgs.), 10.1038/srep38835.
S.W. Chen, X. Cao, N. Wang, L. Ma, H.R. Zhu, M. Willander, Y. Jie, Z.L. Wang, An ultrathin flexible single-electrode triboelectric-nanogenerator for mechanical energy harvesting and instantaneous force sensing, Advanced Energy Materials, 7 (2016), p. 1601255 (9 pgs.), 10.1002/aenm.201601255.
Y. Yang, H. Zhang, Z.-H. Lin, Y.S. Zhou, Q. Jing, Y. Su, J. Yang, J. Chen, C. Hu, Z.L. Wang, Human skin based triboelectric nanogenerators for harvesting biomechanical energy and as self-powered active tactile sensor system, ACS Nano, vol. 7, No. 10, (2013), pp. 9213-9222, 10.1021/nn403838y.
W. Yang, J. Chen, G. Zhu, J. Yang, P. Bai, Y. Su, Q. Jing, X. Cao, Z.L. Wang, Harvesting energy from the natural vibration of human walking, ACS Nano, vol. 7, No. 12, (2013), pp. 11317-11324, 10.1021/nn405175z.
Y. Zi, J. Wang, S. Wang, S. Li, Z. Wen, H. Guo, Z.L. Wang, Effective energy storage from a triboelectric nanogenerator, Nat. Commun., 7 (2016), p. 10987 (8 pgs.), I 0.1038/ncomms10987.
B. Lee, D. Orr, The Triboelectric Series—AlphaLab, Inc, AlphaLab, Inc. (n.d.)., 2018, 5 pgs., https://www.alphalabinc.com/triboelectric-series/.
S. Rathore, S. Sharma, B.P. Swain, R.K. Ghadai, A critical review on triboelectric nanogenerator, IOP Conf. Ser. Mater. Sci. Eng., 377 (2018), Article 012186 (17 pgs.), 10.1088/1757-899X/377/1/012186.
A.F. Diaz, R.M. Felix-Navarro, A semi-quantitative tribo-electric series for polymeric materials: the influence of chemical structure and properties, Journal of Electrostatics. 62 (2004) pp. 277-290. 649 https://doi.org/10.1016/j.elstat.2004.05.005.
H. Zou, Y. Zhang, L. Guo, P. Wang, X. He, G. Dai, H. Zheng, C. Chen, A.C. Wang, C. Xu, Z.L. Wang, Quantifying the triboelectric series, Nat. Commun., 10 (2019), pp. 1-9, 10.1038/s41467-019-09461-x.
H.-J. Yoon, H. Ryu, S.-W. Kim, Sustainable powering triboelectric nanogenerators: approaches and the path towards efficient use, Nanomater. Energy, 51 (2018), pp. 270-285, 10.1016/j.nanoen.2018.06.075.
X. Pu, M. Liu, X. Chen, J. Sun, C. Du, Y. Zhang, J. Thai, W. Hu, Z.L. Wang, Ultrastretchable, transparent triboelectric nanogenerator as electronic skin for biomechanical energy harvesting and tactile sensing, Science Advances, 3 (2017), Article e170001.5, 1.0.1.1.26/sciadv.1700015, 10 pgs.
Dscout Research: People Touch Cellphones 2,617 Times a Day—Business Insider, of Jul. 13, 2016, (n.d.), https://www.businessinsider.com/dscout-research-people-touch-cell-phones-2617-times-a-day-2016-7.
T. Yasin, S. Ahmed, M. Ahmed, F. Yishii, Effect of concentration of polyfunctional monomers on physical properties of acrylonitrile-butadiene rubber under electron-beam irradiation, Radiat. Phys. Chem., 73 (2005), pp. 155-158, 10.1016/jradphyschem.2004.07.009.
M. Mecozzi, L. Nisini, The differentiation of biodegradable and non-biodegradable polyethylene terephthalate (PET) samples by FTIR spectroscopy: a potential support for the structural differentiation of PET in environmental analysis, Infrared Phys. Technol., 101 (2019), pp. 119-126, 10.1016/j.infrared.2019.06.008.
K. Elnagar, T. Elmaaty, S. Raouf, Dyeing of polyester and polyamide synthetic fabrics with natural dyes using ecofriendly technique, Journal of Textiles (2014), 9 pgs., Article ID 363079, 10.11.55/2014/363079.
A.a.M. El-Saftaway, Regulating the Performance Parameters of Accelerated Particles, Zagazig University, (2013), http://inis.iaea.org/Search/search.aspx?orig_q=RN:46135147, 150 pgs.
S. Samantarai, A. Nag, N. Singh, D. Dash, A. Basak, G.B. Nando, N.C. Das, Chemical modification of nitrile rubber in the latex stage by functionalizing phosphorylated cardanol prepolymer: a bio-based plasticizer and a renewable resource, Journal of Elastomers & Plastics, 1-31, The Author(s) (2018), pp. 99-129, 10.1177/0095244318768644.
A. Alhareb, H. Akil, Z. Ahmad, Poly(methyl methacrylate) denture base composites enhancement by various combinations of nitrile butadiene rubber/treated ceramic fillers, J. Thermoplast. Compos. Mater., 30 (2015), pp. 1069-1090, 10.1177/0892705715616856.
Y. Zou, P. Tan, B. Shi, H. Ouyang, D. Jiang, Z. Liu, H. Li, M. Yu, C. Wang, X. Qu, L. Zhao, Y. Fan, Z.L. Wang, Z. Li, A bionic stretchable nanogenerator for underwater sensing and energy harvesting, Nat. Commun., 10 (2019), p. 2695 (10 pgs.), 10.1038/s41467-019-10433-4.
L. Gu, N. Cui, L. Cheng, Q. Xu, S. Bai, M. Yuan, W. Wu, J. Liu, Y. Zhao, F. Ma, Y. Qin, Z.L. Wang, Flexible fiber nanogenerator with 209 V output voltage directly powers a light-emitting diode, Nano Lett., 13 (2012), pp. 91-94, 10.1021/nl303539c.
X. Wang, B. Yang, J. Liu, Y. Zhu, C. Yang, Q. He, A flexible triboelectric-piezoelectric hybrid nanogenerator based on P(VDE-TrFE) nanofibers and PDMS/MWCNT for wearable devices, Sci. Rep., 6 (2016), p. 36409 (10 pgs.), 10.1038/srep36409.
M. Murai, H.-R. Lau, B.P. Pereira, R.W.H. Pho, A cadaver study on volume and surface area of the fingertip, J. Hand Surg., vol. 22A, No. 5, (1997), pp. 935-941, 10.1016/50363-5023(97)80094-9.
K. Parida, G. Thangavel, G. Cai, X. Zhou, S. Park, J. Xiong, P.S. Lee, Extremely stretchable and self-healing conductor based on thermoplastic elastomer for all-three-dimensional printed triboelectric nanogenerator, Nat. Commun., 10 (2019), p. 2158 (10 pgs.), 10.1038/s41467-019-10061-y.
C. Ramon, P. Garguilo, E.A. Fridgeirsson, J. Haueisen, Changes in scalp potentials and spatial smoothing effects of inclusion of dura layer in human head models for EEG simulations, Front. Neuroeng., vol. 7, Article 32, (2014), 8 pgs.,10.3389/fneng.2014.00032.
A. Boonbumrung, P. Sae-Oui, C. Sirisinha, Reinforcement of multiwalled carbon nanotube in nitrile rubber: in Comparison with carbon black, conductive carbon black, and precipitated silica, J. Nanomater. Article ID. 6391572 (2016), 9 pgs., dx.doi.org/10.1155/2016/6391572.
Y. Zhu, B. Yang, J. Liu, X. Wang, L. Wang, X. Chen, C. Yang, A flexible and biocompatible triboelectric nanogenerator with tunable internal resistance for powering wearable devices, Sci. Rep., 6 (2016), p. 22233 (10 pgs.), 10.1038/srep22233.
H. Zhang, Y. Yang, T.-C. Hou, Y. Su, C. Hu, Z.L. Wang, Triboelectric nanogenerator built inside clothes for self-powered glucose biosensors, Nanomater. Energy, 2 (2013), pp. 1019-1024, 10.1016/j.nanoen.2013.03.024.
D. Yoo, E.Y. Go, D. Choi, J.-W. Lee, I. Song, J.-Y. Sim, W. Hwang, D.S. Kim, Increased interfacial area between dielectric layer and electrode of triboelectric nanogenerator toward robustness and boosted energy output, Nanomaterials, 9 (2019), p. 71 (11 pgs.), 10.3390/nano9010071.
X. Hu, S. Li, H. Peng, A comparative study of equivalent circuit models for Li-ion batteries, Journal of Power Sources. 198 (2012) pp. 359-367. https://doi.org/10.1016/j.jpowsour.2011.10.013.
G. Zhu, Z.-H. Lin, Q. Jing, P. Bai, C. Pan, Y. Yang, Y. Zhou, Z.L. Wang, Toward large-scale energy harvesting by a nanoparticle-enhanced triboelectric nanogenerator, Nano Lett., 13 (2013), pp. 847-853, 10.1021/nl4001053.
M. Tsuji, S. Hikino, R. Tanabe, Y. Sano, Synthesis of bicompartmental Ag/Cu nanoparticles using a two-step polyol process, Chem. Lett., vol. 38, No. 8 (2009), pp. 860-861, 10.1246/cl2009.860.

(56) References Cited

OTHER PUBLICATIONS

J.A. Adekoya, E.O. Dare, M.A. Mesubi, Tunable morphological properties of silver enriched platinum allied nanoparticles and their catalysed reduction of p-nitrophenol Adv. Nat. Sci. Nanosci. Nanotechnol., 5 (2014), 13 pgs., Article 035007, 10.1088/2043-6262/5/3/035007.

A.R. Chowdhury, A.M. Abdullah, I. Hussain, J. Lopez, D. Cantu, S.K. Gupta, Y. Mao, S. Danti, M.J. Uddin, Lithium doped zinc oxide based flexible piezoelectric-triboelectric hybrid nanogenerator, Nano Energy, 61 (2019), pp. 327-336, 10.1016/j.nanoen.2019.04.085.

M.S. Dresselhaus, I.L. Thomas, Alternative energy technologies, Nature, vol. 414 (2001), pp. 332-337.

A.R. Chowdhury, J. Jaksik, I. Hussain, R. Longoria, III, O. Faruque, F. Cesano, D. Scarano, J. Parsons, M.J. Uddin, Multicomponent nanostructured materials and interfaces for efficient piezoelectricity, Nano-Structures & Nano-Objects, 17 (2019), pp. 148-184, 10.1016/j.nanoso.2018.12.002.

X. Wang, Y. Yin, F. Yi, K. Dai, S. Niu, Y. Han, Y. Zhang, Z. You, Bioinspired stretchable triboelectric nanogenerator as energy-harvesting skin for self-powered electronics, Nanomater. Energy, 39 (2017), pp. 429-436, 10.1016/j.nanoen.2017.07.022.

T. Huang, C. Wang, H. Yu, H. Wang, Q. Zhang, M. Zhu, Human walking-driven wearable all-fiber triboelectric nanogenerator containing electrospun polyvinylidene fluoride piezoelectric nanofibers, Nanomater. Energy, 14 (2015), pp. 226-235, 10.1016/j.nanoen.2015.01.038.

L. Lu, X. Han, J. Li, J. Hua, M. Ouyang, A review on the key issues for lithium-ion battery management in electric vehicles, J. Power Sources, 226 (2013), pp. 272-288, dx.doi.org/10.1016/j.jpowsour.2012.10.060.

T. Shen, Y. Liu, Y. Zhu, D.-Q. Yang, E. Sacher, Improved adhesion of Ag NPs to the polyethylene terephthalate surface via atmospheric plasma treatment and surface functionalization, Appl. Surf Sci., 411 (2017), pp. 411-418, 10.1016/j.apsusc.2017.03.149.

\* cited by examiner

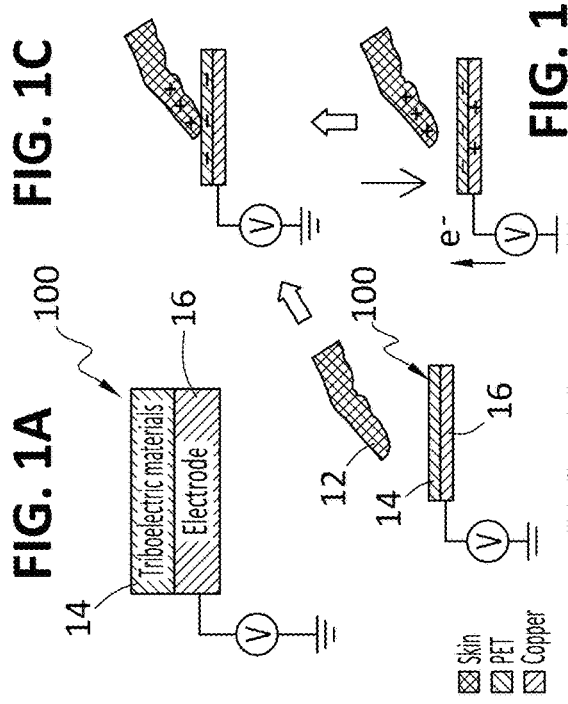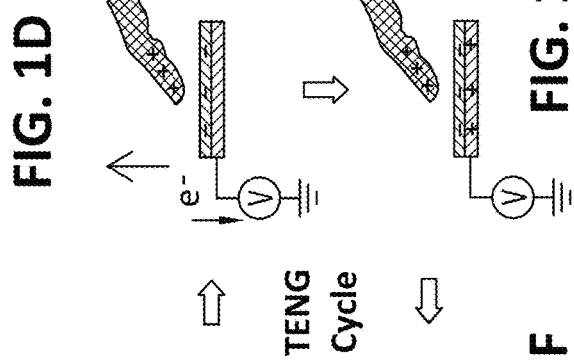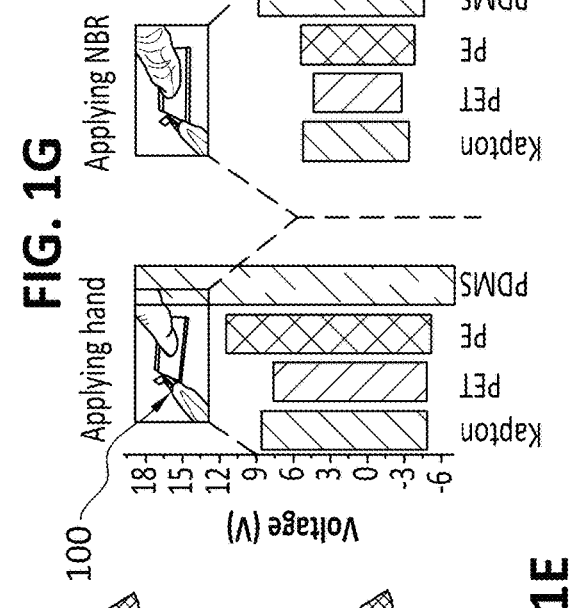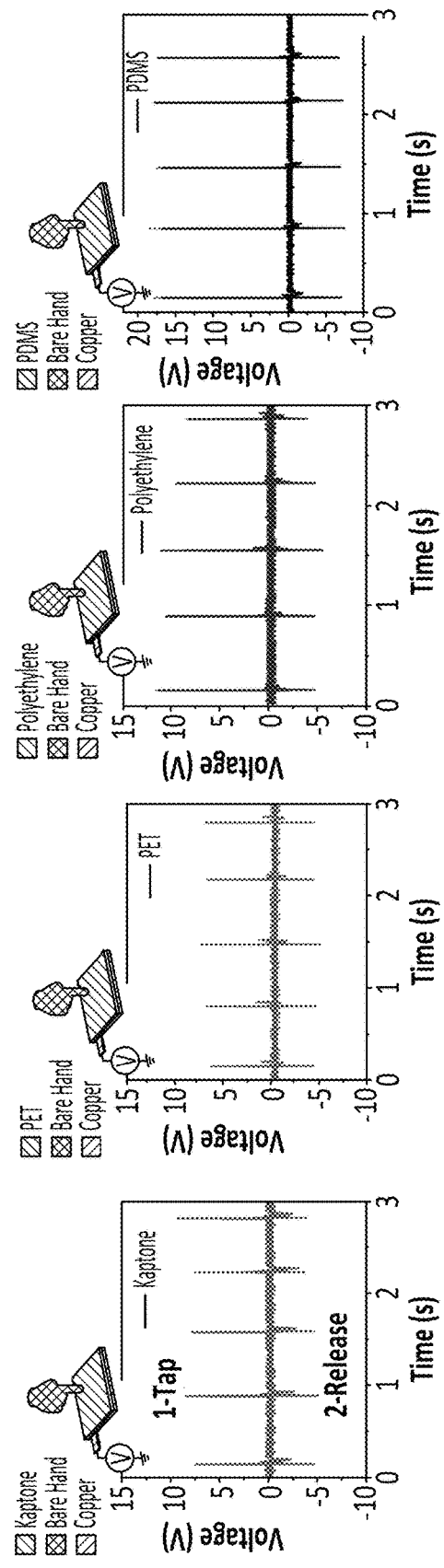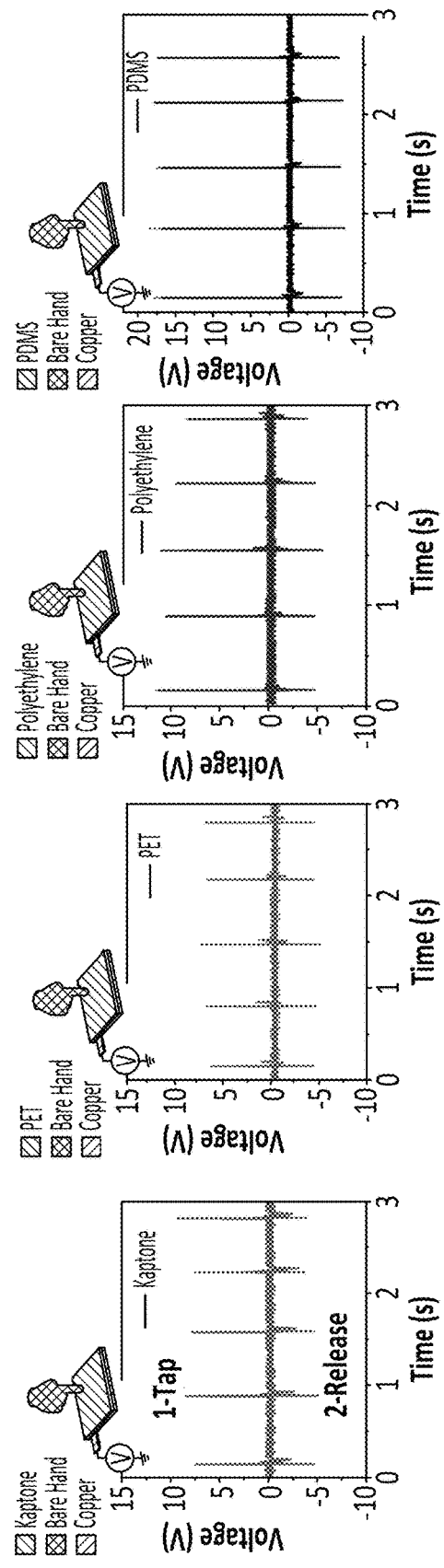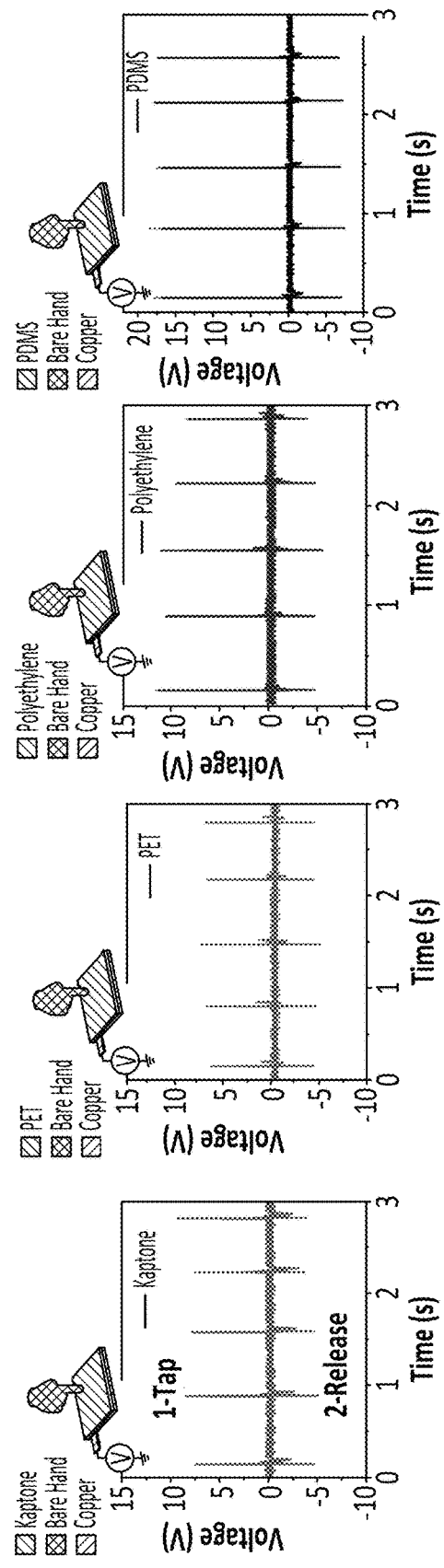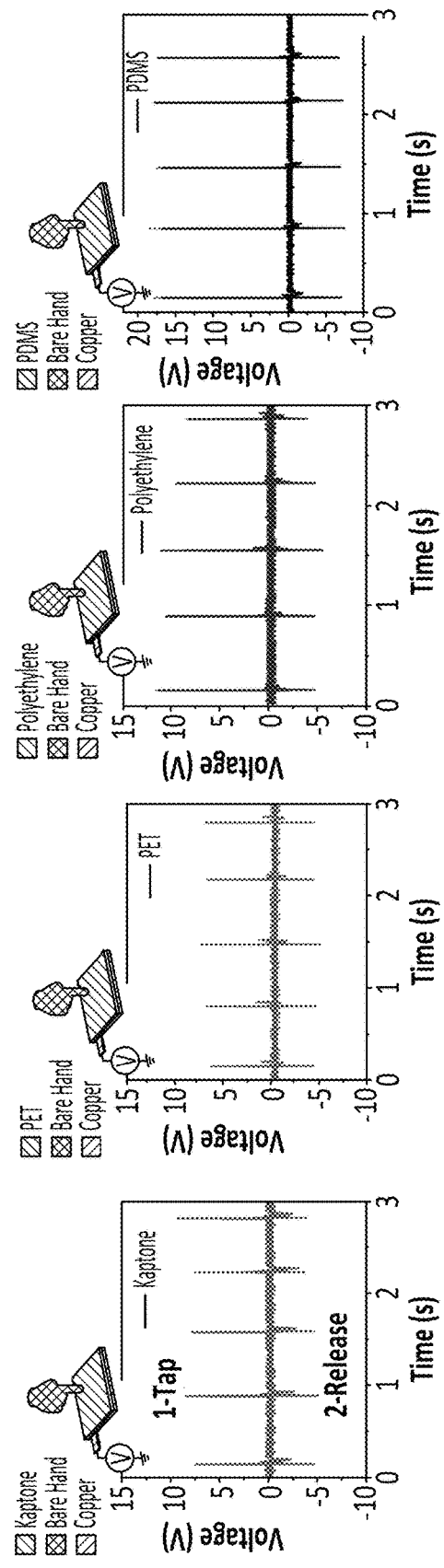

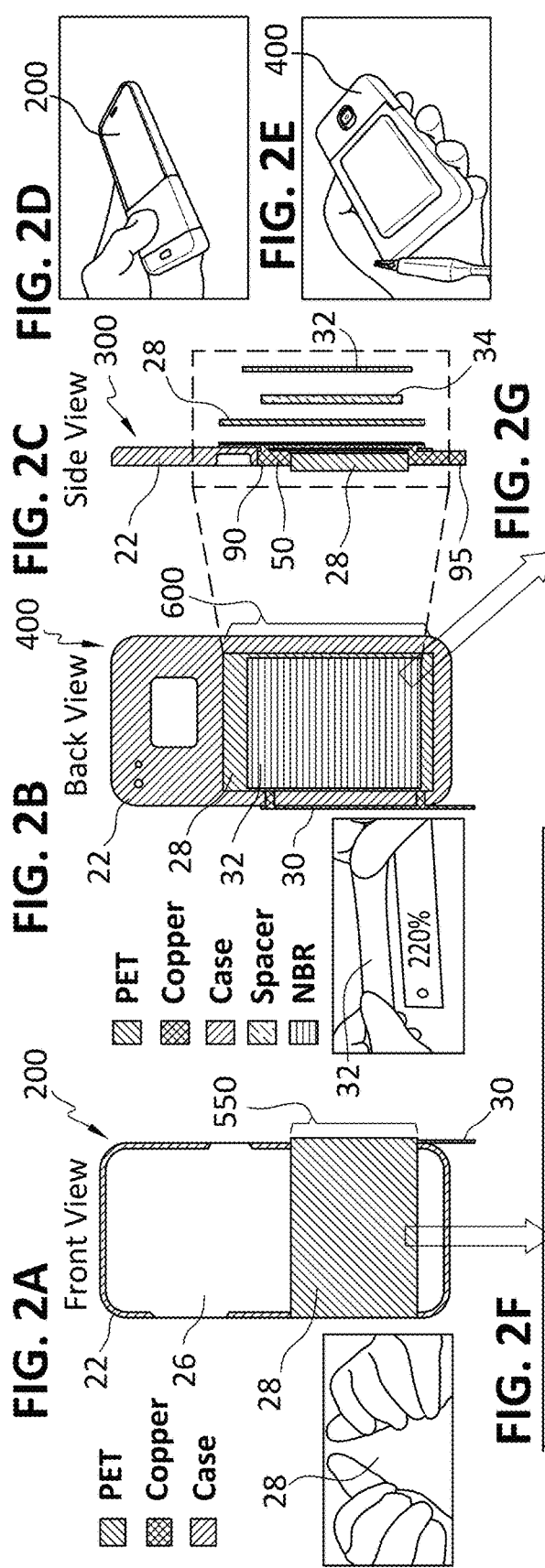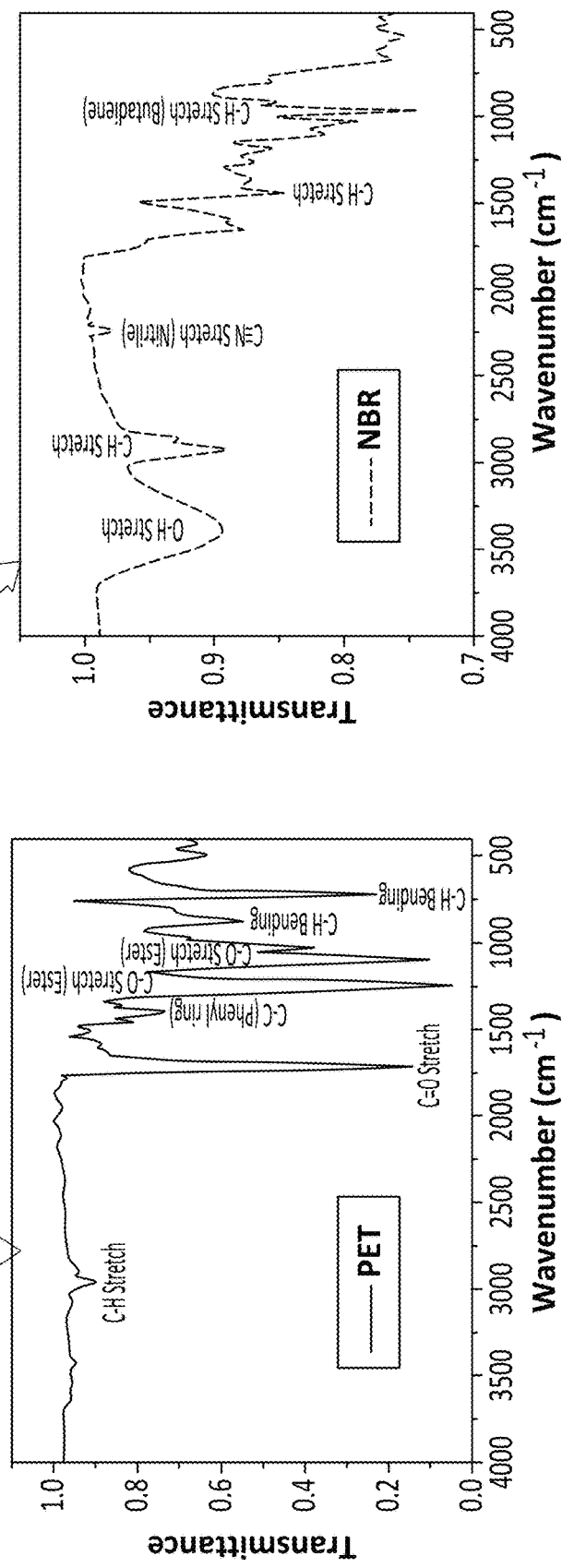

Load Applied on Front Part

Load Applied on Back Part

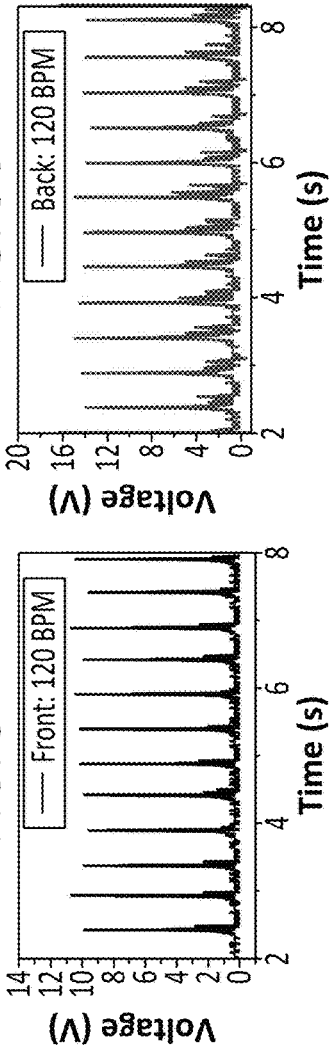

Switch On

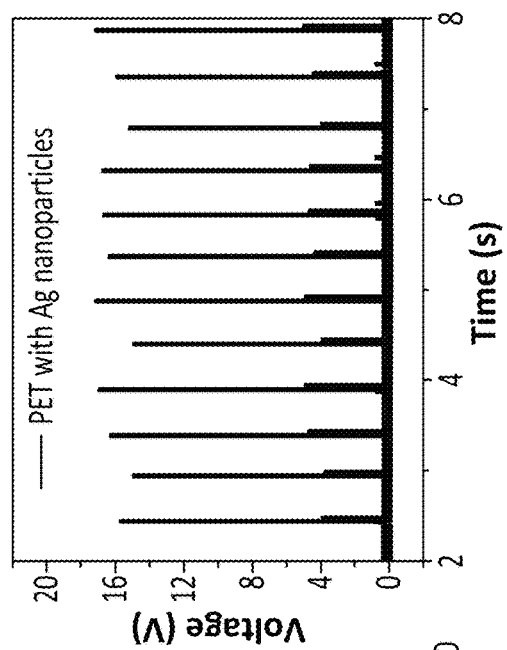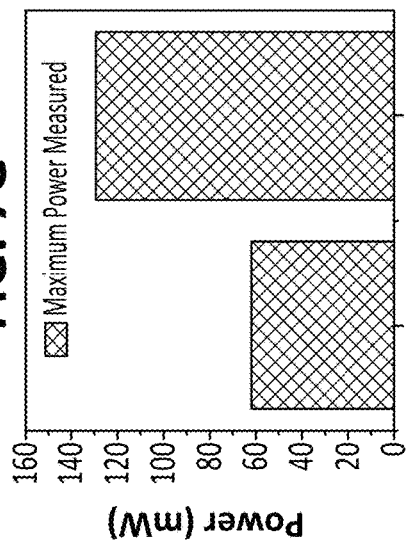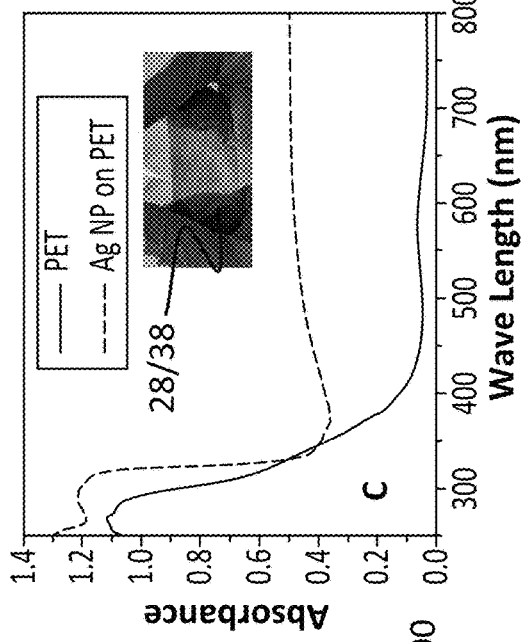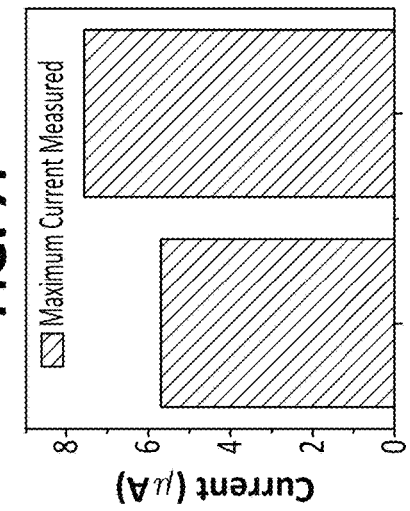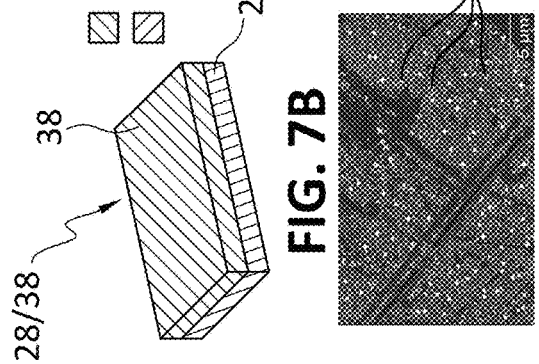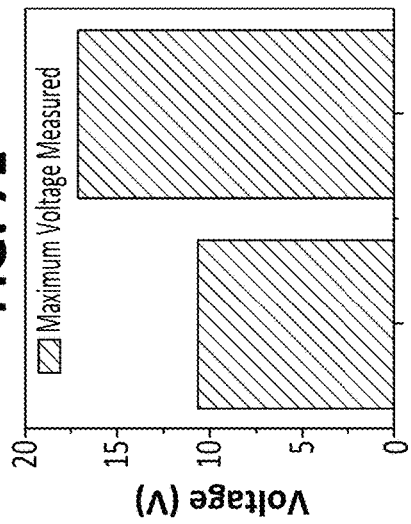

SELF-SUSTAINABLE TRIBOELECTRIC ENERGY CASE FOR POWERING DEVICES

RELATED APPLICATIONS

The present application is a continuation of U.S. patent application Ser. No. 17/520,523, filed Nov. 5, 2021, which will issue as U.S. Pat. No. 12,101,040 on Sep. 24, 2024, which claimed priority to U.S. Provisional Patent Application 63/110,289, filed Nov. 5, 2020, each of which is incorporated herein in its entirety.

FIELD OF THE INVENTION

The present invention generally relates to the field of electrical energy generating and supplying devices, components, assemblies and storage and/or carrying cases, as well as methods for providing same.

BACKGROUND OF THE INVENTION

Modern electronic devices like cellphones, tablets, and calculators, for example, are preferably relatively small, lightweight and efficient. These characteristics are deemed, at least in some situations, to improve the relative portability of the electronic devise. These factors are also considered, at least in some degree, to affect the relative performance of the item in the consumer market [27]. Electronic devices have achieved some degree of improvement in relative weight, thickness and compactness. The changing, and generally smaller, configurations of these and other forms of electronic devices reduces the options for improving the technologies in these types of devices [28].

Due to the challenges of growing consumption of available natural resources, in the wake of growing environmental pollution concerns associated with conventional energy production methods and energy sources, more sustainable energy production development, especially green energy, is needed to meet current and future energy demands around the world for producing and maintaining electronic devices. [[5], [6], [7], [8]].

Mechanical energy may be scavenged from the environment, a technique described as energy scavenging. Various energy generating potential sources, such as Piezoelectric, Electrostatic, Electromagnetic, Pyroelectric and triboelectric effects, are generally described as sources for environmentally friendly energy harvesting and/or scavenging [[9], [10], [11], [12], [13], [14]].

Triboelectric Nanogenerators (TENG) relate to the devices that may be used to harvest mechanical energy from the ambient environment. One source of this type of mechanical energy is human motion. This source of mechanical energy has been proposed for use in fueling electronic devices.

TENG have been generally described for powering electronic devices and sensory application through contact triboelectrification and electrostatic induction [[15], [16], [17]]. Fan et al. (2012) relates to this concept. A preliminary introduction of a nanogenerator was proposed in Wang et al. [18,19]. TENG has been used for driving small electronics devices and for sensors. These uses, at least in part, have emerged due to their low cost, high power density, light weight, and high flexibility and efficiency of TENG [3,9,16 [20], [21], [22], [23], [24]]. The power density has been reported as being as high as 500 Wcm$^{-2}$ (Zhu et al.), and as achieving an energy efficiency of 70.6% (Tang et al. [25, 26]).

More compact and uniquely configured electronic devices have, in most cases, reduced the space allotment for an appropriate energy storage unit, such as a battery, necessary to power many types of electronic devices. Options for energy storage and generation do not include meaningful options for providing a self-sustaining, self-charging, electrical energy generating battery option. However, options suitable for storing energy, and that may be provided in very compact space allotments, in virtually any configuration, and that are adaptable to the size and contours of the electronic device (such as a cell phone), and that are also independent of the size and configuration of the device itself, remain unavailable, and are very much needed. This need continues to grow. In addition, the demand for such energy generating and/or supplying options that are also self-sustaining options, continues to grow. A technological solution that provides more efficient and self-generating electrical energy generating and storing options for the growing and evolving personal and other electronic devices market remains of great need, and would provide far reaching, tremendous commercial value.

SUMMARY OF THE INVENTION

The above and other needs in the prior art are met with the present invention.

The present invention relates to assemblies, constructs, configurations, and/or cases that are adapted to provide a self-sustaining electrical energy generating component, that may be used to provide electrical energy to any number of electronic devices, including but not limited to personal electronic devices (cell phone, electronic table, i-phone, personal computer (laptop, etc.).

The electricity generating components/implements/tools/ assemblies of the devices disclosed herein utilize Triboelectric Nanogenerators (TENG). To utilize the mechanical energy generated from surface contact and touching, a Triboelectricity based Stepping and Tapping Energy Case (TESTEC) is presented and described here.

The components/implements/tools/assemblies disclosed include a carrying case and/or cover assembly, that is suitable especially for placement of a personal device, such as a cell phone, therein. In some embodiments, the configuration of the case incorporates, among other advancements, two or more single electrode TENGs. In these configurations, the incorporation of TENG technology serves to magnify an ability to power touch an electronic device through, for example, transforming mechanical energy, such as that mechanical energy generated from finger touching and/or tapping, and stepping and/or walking motion. These types of mechanical energy sources is adapted together in a component/assembly/implement/tool configured for generating electrical energy for virtually any electronic device. The TENG component renders these options environmentally friendly and efficient, thus providing a solution to environmental and resource availability challenges associated with electricity generating options available.

In order to create a TENG case for an electronic device, that is independent of the size and shape of the electronic device, and that further provides the advantages of ease of use and efficiency, the case, in some embodiments, is preferably constructed using materials appropriate and suitable to impart flexibility and long-life to the case. The case may be described as a cost-effective energy case, having a unique design, this unique design comprising two single electrodes Triboelectric Nanogenerators (TENG). The case is constructed in such a manner as to harness and/or harvest energy generated from mechanical motion, such as that mechanical motion generated from carrying or touching an electronic device placed in the case. The harnessed and/or harvested energy, so generated from the movement resulting from using or carrying the touch electronic device, powers the electronic device continuously and spontaneously.

In some embodiments, the case comprises a front part, the front part of the case comprising a single electrode based TENG. In some embodiments, this front part of the case is fabricated for encasing a front part of a cellphone, or other device, for example. The case includes a clear and/or transparent covering and/or viewing area, to avoid any distortion or hindering to a viewing screen and/or data input panel (keyboard, number pad) of a cellphone, or other device. This selective covering and/or encasement of a cell phone or other personal or commercial use device, therefore is configured so as to not prevent or hinder viewing the screen of data input panel, or any other functional key, port, or button, of the electronic device, while at the same time, protecting the electronic device. In this manner, the functionality of the device remains unaffected.

Materials to fabricate the TENG were chosen based on several features, including their transparency, hardness, and strength. PET (polyethylene terephthalate, or polyester), or any other strong and lightweight substantially equivalent material, having similar transparency, hardness, and strength, may be used in the fabrication of the case. Such PET and similar materials therefore render the case environmentally friendly, and may be incorporated as a TENG for the front part of the case.

The TENG may be prepared by attaching PET (or other similar material) on the screen of a cellphone (or other electronic device), and configuring copper connected to a small surface of the PET material at one side of the cellphone. In some embodiments, the TENG may function in a single-electrode mode. This single-electrode mode TENG is activated as a result of skin (such as the skin surface of an animal or human) touching the PET surface of the case/container/assembly, and the mechanical energy generated as a result of such skin contact, being harvested and used to generate electricity (TENG mechanism) that is then used to power an electronic device. The front part was further modified using Ag nanoparticles over the PET film which was tested at 120 beats per minute (BPM) load frequency.

The back part of the carrier/assembly/case will comprise a second nanogenerator, the second nanogenerator is located on the back part of the TENG. To optimally harness mechanical energy, a TENG was developed that can process and utilize mechanical energy that may be generated, for example, by walking or finger tapping. The back part is made with NBR and Polyethylene. The back part of the assembly/component/case comprises PET, NBR and copper. NBR was used for fabricating the TENG of the back part as it gave good response with PET. In operation, it works through friction as a single-electrode TENG. The motion that is created by walking is enough to make these two materials (layers) touch each other. The combination of the front and back parts of the TENG may be described as a Triboelectricity based Stepping and Tapping Energy Case (TESTEC). The TESTEC device utilizes the mechanical energy associated with the daily mechanical movement and touch associated with daily use of smart electronic devices. The presently described TESTEC—based constructs present a solution for the creation of cost effective and self-sustaining electronic devices.

Benefits and advantages of the TESTEC include the ability to use recyclable plastics from the environment. The TESTEC may also reduce the necessity of charging smart electronic devices through usual means, and continued use of the TESTEC technology at the industrial level will promote renewable energy and sustainable development.

A novel example case for a TESTEC was constructed with two single electrode TENG operating through the triboelectric mechanism between human skin and Polyethylene terephthalate (PET) film on the front part and Nitrile Butadiene Rubber (NBR) and PET film on the back part of the case. This cost effective device/case is demonstrated as useful for energy generation when attaching it to a cell phone at variable load frequency, airgap and finger combinations where the output response was shown to increase with the increased frequencies (60-240 BPM) and air gap (1 cm-5 cm). Maximum output voltages of 14.8 V and 50.8 V were obtained for the front and back parts, respectively. Maximum power output was observed to be 3.78 $W/m^2$ at 0.46 MΩ and 6.21 $W/m^2$ at 1.02 MΩ, respectively.

The TESTEC device is also demonstrated to be advantageous integrated with conventional electronic components, including capacitors, bridge rectifiers and 15 LEDs. Based on the results, an electrical circuit is provided to power touch cell phones. The device may be further modified to include a polymeric layer (PET layer) that includes Silver (Ag) (or other metal, such as copper or gold) nanoparticles as part of the construction of the front part. This embodiment is a modified TESTEC, and is demonstrated here to provide even higher output response, compared to TESTEC constructs without incorporated metal nanoparticles. The TESTEC is a self-sustainable power touch component for electronic devices, which may reduce and/or eliminate the necessity to conventionally charge electronics devices.

In other embodiments, a cost-effective and self-sustainable energy case containing two single electrodes triboelectric nanogenerators may be designed and fabricated to power smart electronic devices by utilizing the mechanical energy generated while using or carrying the device. The device was thoroughly tested by measuring various parameters such as airgaps, load frequencies and finger combinations. Testing was further conducted with bridge rectifiers, resistors, capacitors and LEDs to verify the device's compatibility with conventional electronic components and its ability to power smart electronic devices.

In another aspect, an energy supplying and/or storing multifunctional device covering assembly is provided. In one embodiment, the covering assembly comprises a front part, a side area, and a back part, wherein: the front part comprises a first triboelectric nanogenerator (TENG), said first TENG comprising a single electrode TENG, the front part further comprising a durable polymeric film, said film comprising a transparent area configured to cover a touch screen of an electronic device placed in the assembly; wherein the side area comprises a copper component and a polymeric layer, wherein said side area of the assembly is configured to cover a side of an electronic device placed in the assembly; and wherein the copper component comprises a first end and a second end, wherein the first end is attached to the transparent area of the PET film, and the second end is configured to cover the side area of the assembly. A touch to the transparent area covering the touch screen of the electronic device results in the generation of mechanical energy. The first TENG will generate electrical energy from the mechanical energy, and this electrical energy will then be made available to power and/or recharge an electronic device placed in the assembly. The back part of the assembly comprises a second triboelectric nanogenerator (TENG), a nitrile butadiene rubber (NEG) material layer, a polyethylene terephthalate (PET) layer, a copper film and a spacer layer, wherein the copper film is placed in the center of the back part and is in communication with the copper cover of the side area of the assembly. The polyethylene layer is placed over the copper film, and the spacer layer is located between the NEG material layer and the PET or other polymeric material layer, and frictional contact between the layers of the back part produces motion generated energy, and the second TENG generates electrical energy from the motion generated energy, this electrical energy being delivered to and/or used to recharge an electronic device placed in the assembly.

BRIEF DESCRIPTION OF THE DRAWINGS

FIGS. 1A-1K; FIG. 1A—Single Electrode Triboelectric Nanogenerator for primary testing. Working Mechanism: 1B—Initial stage of the TENG, 1C—Full contact with the finger, 1D—Finger released from the TENG, 1E—Full separation from the TENG, 1F—Finger moving towards the TENG, 1G—Maximum peak to peak voltage observed applying hand and NBR for different materials. Voltage observed applying hand with 1H—Kapton, 1I—PET, 1J—Polyethylene (PE), and 1K—Polydimetbylsiloxane (PDMS).

FIGS. 2A-2G: 2A—Front view 200 (inset: transparent polymeric (PET) films [28]), 2B—Back view 400 (inset: Highly stretchable NBR films, 32, and 2C—Side view 300 of the mobile attached TESTEC schematic. 22=case, 50=Copper component, 90=first end of copper component, 95=second end of copper component, 2D—Front part 200, 2E—back part 400 of the optical view of the TESTEC. Fourier-transform infrared spectroscopy (FTIR) spectra of 2F—PET film and 2G—NBR film. [28]=Polymeric layer (Polyethylene terephthalate (PET)), 34=Spacer).

FIGS. 5A-5L; 5A—Circuit diagram for rectifying the signals by TESTEC. Rectified voltage signal at 120 BPM load frequency for 5B—front part and 5C—back part. 5D—Schematic circuit diagram, C-Capacitor 800, and Full bridge rectifier 112 and 5E—Optical view of circuit diagram for charging and discharging capacitors with TESTEC. Charging capacitors of variable capacitance for 60 s by applying load on the 5F—front part 200 and 5G—the back part 400 of the TESTEC. 5H—Ability of the TESTEC to charge and capacitors for different load frequencies by applying load on the front part 200. 5I—Average voltage and current measured at variable external resistance with front part 200 of the TESTEC. 5J—Average power measured by applying load on the front part 200 of the TESTEC at different external resistances. 5K—Power measured by applying load on the front part of the TESTEC at different external resistances. 5L—Average power measured by applying load on the back part of the TESTEC at different external resistance.

FIGS. 7A-7G; 7A—(7A)—Ag nanoparticles 100 over PET film. Ag/PET 28/38 7B—Scanning Electron Microscope (SEM) image of Ag 100 sputtered PET film for the modified TESTEC. 7C—Ultraviolet-visible (UV) Vis Spectra of PET film with and without Ag nanoparticles 100. (inset: Optical view of the Ag sputtered PET film) 7D—Rectified voltage signal by the modified TESTEC at 120 BPM load frequency. 7E—Comparison between maximum rectified voltages obtained from standard and modified TESTEC. 7F—Comparison between maximum rectified current obtained from standard and modified TESTEC. 7G—Comparison between maximum rectified power (mW) obtained from standard (PET) and modified (Ag/PET) TESTEC.

DETAILED DESCRIPTION OF PREFERRED EMBODIMENTS

Figure 3A:
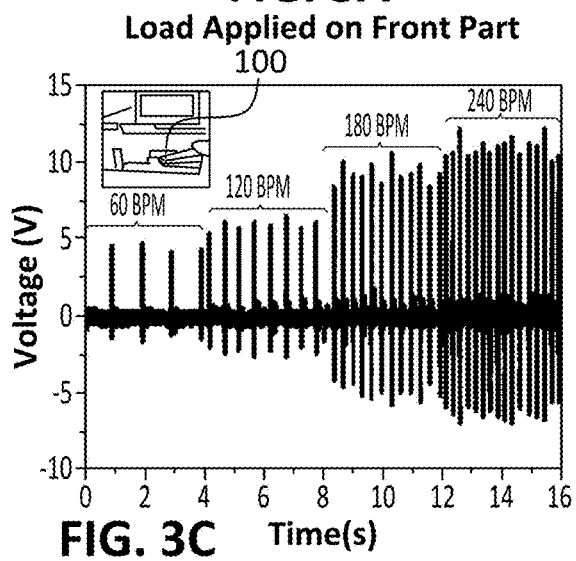
FIGS. 3A-3F; Voltage observed for different load frequency on 3A—front part 200 (inset: Device during tapping on the front part) and 3B—back part 400 (inset: Device during stepping). Current observed for different load frequency on 3C—front part and 3D—Back part 400. Comparison of maximum peak to peak voltage and current observed for 3E—front part and 3F—back part with error bars (Standard deviation for 3 readings).

Unless defined otherwise, all technical and scientific terms used herein have the same meaning as commonly understood by one of skill in the art to which the disclosure pertains. Although any methods and materials similar to or equivalent to those described herein can be used in the practice or testing of the present technology, the preferred methods and materials are described herein.

Reference to an element by the indefinite article "a" or "an" does not exclude the possibility that more than one element is present, unless the context clearly requires that there be one and only one element. The indefinite article "a" or "an" thus usually means "at least one."

As used herein, "about" means within a statistically meaningful range of a value or values such as a stated distance, load, voltage or electric potential, power, energy, energy absorbance efficiency, energy flux, current, wavelength, wavenumber, frequency, charge, charge affinity, inductance, resistance, resistivity, conductance, conductivity, spectrometry or spectroscopy measurement, or timeframe. Such a value or range can be within an order of magnitude, typically within 20%, more typically within 10%, and even more typically within 5% of a given value or range. The allowable variation encompassed by "about" will depend upon the particular system under study, and can be readily appreciated by one of skill in the art.

As used herein, "a number of" when used with reference to items, means one or more items. For example, "a number of different types of networks" is one or more different types of networks.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The following examples are not intended to limit or otherwise confine the scope of the many aspects and configurations of the invention, and are provided only for purposes of illustration.

Example 1—Preparation of A Single Electrode Triboelectric Nanogenerator (SETENG)

The present example provides a disclosure and description of a single electrode triboelectric nanogenerator. Other materials apart from those specifically described in this example may be used.

A single electrode triboelectric nanogenerator (SETENG) was prepared using copper (Cu) films with dimensions of 4 cm by 3 cm. Commercially available PET, PE and PP films of the same dimension were also attached with the Cu films. An extension of the Cu film was added for attaching the device to the SETENG. Alligator clips were used to facilitate this attachment.

Polydimethylsiloxane (PDMS) was implemented in the SETENG using 2 grams of PDMS (Sylgard 184 Silicone Elastomer Base) and 10% by weight of a curing agent (Sylgard 184, Elastomer Curing Agent). The reagents were mixed using a vortex mixer. This mixture was then deposited and/or placed as a layer on the Cu film using the Doctor Blade technique, followed by drying at room temperature for 36 hours.

For all examples and embodiments illustrated, a Samsung J5 cellphone was used with a cellphone case manufactured by Writeright. The materials used for the frontal part of the TESTEC were a commercial PET film and copper tape. The PET film was cut to dimensions of 8 cm by 4 cm, leaving a small extra surface of excess film formed to the side of the film, and then cleaned with ethanol. A copper tape was attached to one side of the device. Then the small extra surface previously left was bent and placed over the copper tape. The PET film was attached with tape from the exterior part.

The back part 400 of the TESTEC was made with NBR 32 manufactured by VWR, PET, and copper. A copper film 30 was cut with dimensions of 9 cm by 6 cm, but not larger than the cellphone device. The copper film 30 was cleaned with ethanol and placed in the center on the back part 400 properly attached with copper tape to maintaining a connection with the copper tape previously attached to one of the sides of the device. A PET film was cut with the same dimensions of the copper film, cleaned with ethanol and attached over the copper film 30 with tape. Polyurethane foam was used as a spacer 34, and it was cut to dimensions of 5.5 cm by 7.5 cm with a thickness of 0.3 cm and then cut from the inside leaving a 0.8 cm of width to yield a shape of frame. The cut spacer material 34 was then attached with glue over the polyethylene film 28. The NBR film 32 followed the same process cut with similar dimensions as the other materials, cleaned with ethanol and attached with copper tape.

The TESTEC was further modified using silver (Ag) nanoparticles 100 on the PET film. Ag nanoparticles were sputtered on the PET film using a magnetron sputtering system produced by AJA International, Inc., the ATC-Orion-5UHV. The sputtering was done at rate of 0.5 nm/s until a 10 nm thick later was formed. The modified PET film was then attached with the case 22 as previously discussed above.

The energy absorbance efficiency for the PET and NBR films was measured using Fourier-transform infrared spectroscopy (FTIR). FTIR Spectra of the PET and NBR film were obtained using VERTEX 70v FTIR Spectrometer (Bruker) in Attenuated Total Reflection (ATR) mode. Transmittance of the both samples were recorded at wavelength from 450 $cm^{-1}$ to 4000 $cm^{-1}$.

The UV-Vis spectra of the modified PET film were measured using Perkin Elmer Lambda 950 UV-Vis Spectrometer from 250 $cm^{-1}$ to 800 $cm^{-1}$ The output voltage signal from the TESTEC was characterized with the Tektronix TDS1001B digital oscilloscope, while the current signal was measured using a low noise current pre amplifier (Stanford Research SR570). For further confirmation, the VersaSTAT 3 potentiostat and Tektronix A622 current probe were used for voltage and current measurement, respectively. All testing was carried out in ambient environment.

Example 2: Testing Triboelectric Output For Finger Tapping Using Different Materials FIG. 1A shows a single electrode triboelectric nanogenerator (SETENG) 16 which was fabricated using different materials for creating an energy case for an electrical case.

Prepared according to the present to test the triboelectric effect from a finger tapping motion 12. The testing device included a layer of testing material and a Copper electrode. The test was run by applying a tapping motion on the device with bare fingers—FIG. 1A, and fingers covered with NBR—FIG. 1C. Human skin and NBR have a low affinity for surface electrons according to the triboelectric series [36,54]. To obtain higher efficiency of the triboelectric effect for a finger covered with NBR, testing materials were selected considering their lower position in the triboelectric series [55]. Hence, Kapton (Polyimide), Polyethylene terephthalate (PET), Polyethylene (PE) and Polydimethylsiloxane (PDMS) were used [22, 54, 56, 57].

The working principle of the SETENG using a tapping motion between a finger and a PET film layer is illustrated in FIGS. 1B-1F. The mechanism can be explained as a combination of contact triboelectrification and electrostatic induction [3, 58] FIG. 1B shows the initial position of the finger, which is kept at a certain distance from the SETENG. During tapping the finger contacts the PET layer (FIG. 1C). Due to the high surface charge affinity of the PET layer, electrons transfer from the skin on the finger to the PET layer, resulting in contact triboelectrification between these two surfaces [3, 36, 54, 57, 59, 60]. As the finger starts separating from the PET layer, electrons start moving to the ground from the Cu electrode to compensate the effect of contact triboelectrification of the PET surface (FIG. 1D). An output voltage signal can be observed due to this effect of electrostatic induction, as seen in FIG. 1H. Eventually, the electrons stop flowing after the complete separation of the two layers as the electrons of the PET surface gets balanced by the induced positive charges of the electrode (FIG. 1E). No output voltage can be observed at this stage. The finger starts moving towards the PET layer again (FIG. 1F). As the positive charges on the finger gets closer to the PET surface, the electrons start moving to the PET surface to maintain the charge balance, resulting in a reversed output voltage. This cycle continues until the tapping motion is stopped. This mechanism is applicable for Kapton, PE, and PDMS as well.

The primary testing was performed at 90 BPM (1.5 Hz) tapping frequency, keeping 3 cm as the distance between the index finger and the testing materials. The results showed different readings of open circuit voltage for different testing materials. FIG. 1G demonstrates the maximum peak to peak voltage obtained from the SETENG for tapping motion with bare and gloved index finger on Kapton, PET, PE and PDMS film. FIGS. 1H through 1K demonstrate the output voltage signal for tapping Kapton, PET, PE and PDMS respectively with bare fingers for 3 s time interval. When the finger taps the film surface, the output voltage rises to the maximum point 1 (as labelled in FIG. 1H). However, the direction of the electron flow changes with the release of pressure, resulting in a reversed output voltage which reaches up to point 2 (as labelled in FIG. 1H). Point 1 and point 2 can be defined as the maximum and the minimum peaks of voltage. The figures indicate that, compared to the other materials, the PDMS film showed the highest triboelectric output when interacting with the bare finger (FIG. 1G). The PDMS film-finger interaction generated a maximum voltage of 18.8V and a peak-to-peak voltage of 7.2V (FIGS. 1G and 1K). Kapton, PET and PE film layers also showed decent output voltage signals for finger tapping, generating maximum output voltages of 8.6 V (FIG. 1H), 7.6 V (FIG. 1I) and 11.5V (FIG. 1J) and peak to peak voltage of 13.4 V, 12.4 V and 16.7 V (FIG. 1G), respectively. According to the triboelectric series, PDMS has the higher electron affinity compared to Kapton, PET or PE [22]. This higher affinity of electrons leads towards higher triboelectric output due to the interaction with bare fingers. It was also observed that a tapping motion with bare fingers (FIG. 1G, Left panel) produced a higher voltage output compared with voltage generated from tapping fingers that are covered with NBR gloves (FIG. 1G, Right panel). The maximum open circuit voltage and peak to peak voltage using the NBR-PDMS interaction was observed to be 8.8V and 13.4V respectively. The maximum peak to peak voltage for Kapton, PET and PE was measured to be 8.6V, 7.3V and 9.2V respectively. This is expected because NBR has a lower position compared to human skin according to the triboelectric series. NBR has a charge affinity of +3 nC/J, which is quite low compared to the charge affinity of human skin (+30 nC/J) [54]. Hence, NBR exhibits a lower triboelectric effect than human skin.

These results demonstrate the utility of using these devices employing a finger tapping mechanism to generate electricity with Kapton, PET, PE and PDMS.

Example 3: Triboelectricity Based Stepping and Tapping Energy Case (TESTEC) Materials and Characterization A TESTEC was developed building on the constructs and results reported above. In one embodiment, the front part 200 of the TESTEC comprises a rectangular shaped, transparent PET film 28 and a copper electrode 30 attached to the PET film (FIG. 2A). PET showed a favorable triboelectric response during the interaction between a finger and NBR, as discussed herein. These thermoplastics have high strength, transparency, light weight, and resistance to impact, shattering, and scratching. NBR is a highly flexible and cost-effective polymer [65, 66]. NBR showed a beneficial triboelectric response when examining the interaction between PET film and NBR gloves as discussed herein. The back part 400 of the TESTEC includes a PET 28 and NBR 32 film separated by an air gap formed by a rectangular-shaped spacer foam 34. A copper film 30 is attached with the PET film, which works as an electrode. FIGS. 2B and 2C demonstrate the back 400 and side 300 view of the TESTEC, respectively. The front 200 and back 400 part of the TESTEC was designed to utilize mechanical energy directly from finger tapping and indirectly from foot stepping.

The characterization of the PET and NBR film was performed through Fourier Transformation Infrared (FTIR) Spectroscopy using Attenuated Total Reflection (ATR) technique.

FIG. 2D provides graphical demonstration of FTIR spectra of the PET film from 400 to 4000 $cm^{-1}$. The asymmetric sharp peak at 1095 $cm^{-1}$ and the symmetric sharp peak at 1243 $cm^{-1}$ are due to C=O stretch in the PET molecules. The peak at 1394 $cm^{-1}$ is from the vibration of the C=C bonds in the phenyl ring. The sharp peak at 719 $cm^{-1}$ denotes C—H bending from the out of plane benzene functional group. The C=O stretch resulted in a sharp peak at the wavelength of 1714 $cm^{-1}$ [67-70]. FIG. 2E shows the FTIR spectra of the NBR film. The peak at 2237 $cm^{-1}$ confirms the presence of a nitrile functional group (C≡N). The peak at 966 $cm^{-1}$ corresponds the C—H stretch from the butadiene functional group. Peaks at 1440 $cm^{-1}$ and 2923 $cm^{-1}$ may be attributed to the C—H stretch of NBR rubber [71, 72].

Figure 3B:
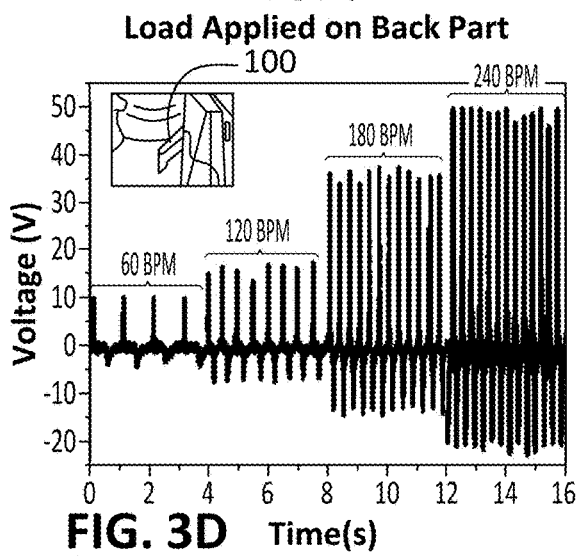

The output characterization of TESTEC was performed under variable load frequency. The front part 200 of the device was tapped with the index finger at 60 BPM (1 Hz), 120 BPM (2 Hz), 180 BPM (3 Hz) and 180 BPM (4 Hz) frequencies while keeping a 3 cm gap between the finger and the front surface (FIG. 3A inset). The voltage output from tapping the back part was tested by stepping at the same frequencies maintaining a 5 cm surface gap between the shoe sole and the floor while the device was set at the pocket (FIG. 3B inset). The graphics in FIGS. 3A and 3B demonstrate the tapping and stepping test of the TESTEC at 120 BPM. The stepping motion results in movement of the thigh which vertically pushes the back part of the TESTEC, creating a triboelectric effect.

Figure 3C:
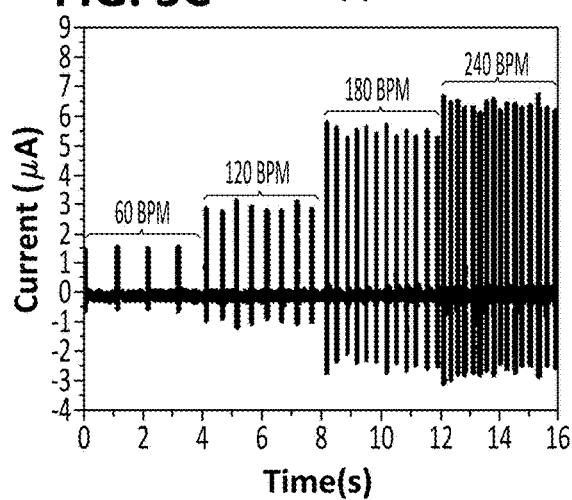
Figure 3D:
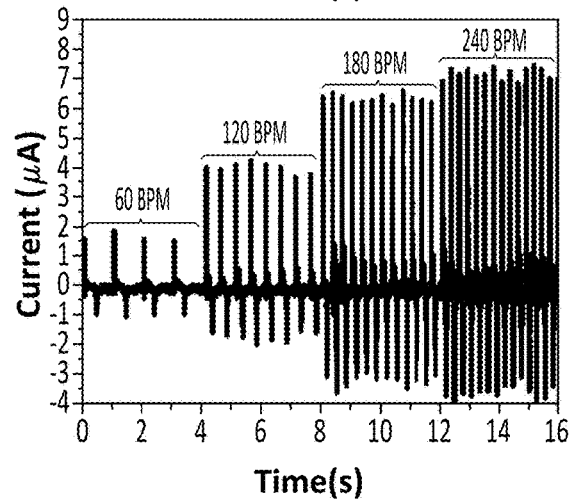

FIGS. 3A and 3B show the open circuit voltage at output recorded at variable load frequency for the front and the back part of the TESTEC, respectively. On the other hand, FIGS. 3C and 3D demonstrate the short circuit current at output for the same load condition. The maximum output voltage observed for the front part was 4.8, 6.6, 10.7 and 12.4 V (FIG. 3A) for 60, 120, 180 and 240 BPM load frequencies respectively. The respective corresponding maximum output currents were 1.6, 3.2, 5.9 and 6.9 µA (FIG. 3B). The impact velocity increases parallelly with load frequency. As a result, the electrons in the external circuit have a shorter time to neutralize the triboelectric potential, leading to a larger flow of electron. Hence, the increase in the frequency leads to a larger current. Correspondingly, the output voltage increased with the increase of current, as voltage is a linear function of the current.

The back part of the TESTEC showed a higher voltage output response than the front part due to the stepping motion. The maximum output voltages for the back part were recorded as 10.6, 17.8, 38.4 and 50.8 V, and the currents were 2.08, 4.48, 6.88 and 7.76 µA respectively. PET showed a higher response with human skin compared to the NBR in the primary experiment discussed above. However, the back part of the device involved higher surface area (54 cm$^2$) in the triboelectric action between the NBR and PET film layers. The finger tapping on the front part only involved the surface area about 6.67 cm$^2$ (index finger tip volar) [76]. The higher surface area resulted in a higher charge transfer between the surfaces, leading to a higher triboelectric output of the back part. However, the front part showed higher output based on current density. Compared to the maximum current density of 0.14 µA/cm$^2$ of the back part at 240 BPM, the front part exhibited a maximum current density of 1.03 µA/cm$^2$ at 240 BPM.

Figure 3E:
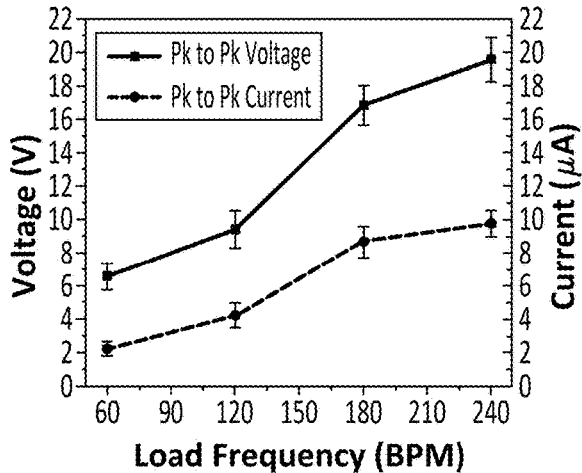
Figure 3F:
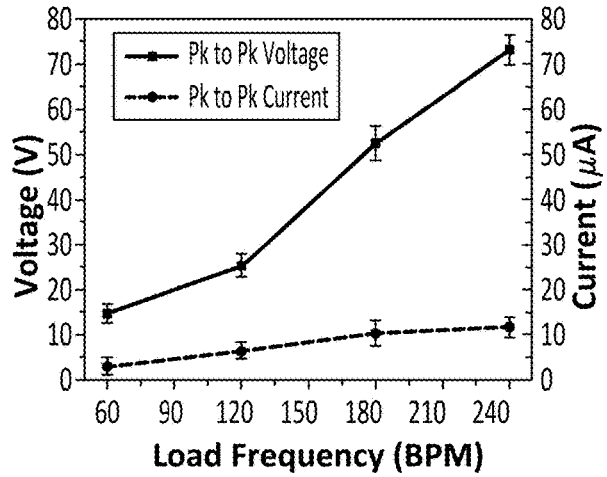

FIGS. 3E and 3F demonstrate a graphical representation of maximum peak to peak output voltage and current observed at variable load frequency for the front and back parts, respectively. The peak to peak current and voltage increased linearly for both parts with increasing frequency. However, the rate of this increase is lower for the peak-to-peak current of the TESTEC's back part, which is due to the higher resistivity of the NBR film on the back part compared to human skin.

Example 4—TESTEC Performance Variation When Changing Operating Surface Gap

The present example demonstrates that the output performance of the TESTEC may be modified by varying the air gap between the operating surfaces.

Figure 4A:
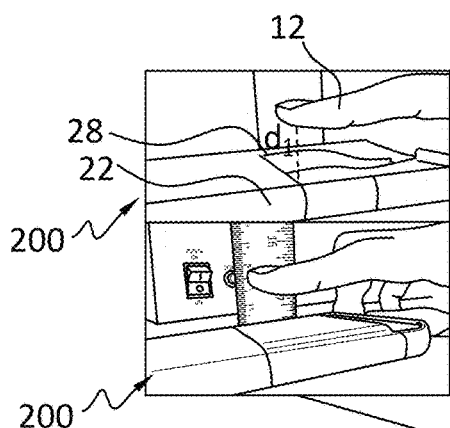
FIGS. 4A-4E; 4A—Tapping and 4B—Stepping Test at variable distance. 4C—Observed voltage at variable distance for the front and back part. 4D—Observed current at variable distance for the front and back part. 4E—Observed maximum voltage at variable fingertip combination.
Figure 4B:
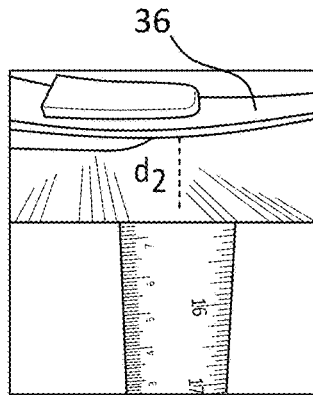
Figure 4E:
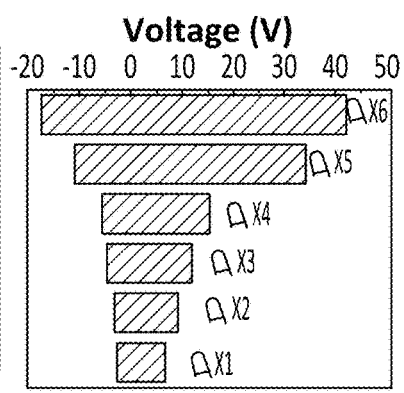
Figure 4C:
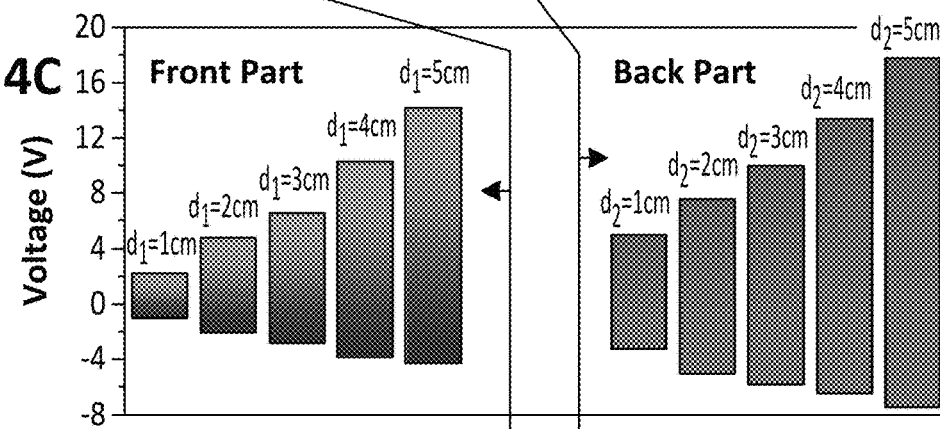

The present study was performed at a 120 BPM tapping and stepping frequency with a variable airgap from 1 to 5 cm for the front (FIG. 4A) and back (FIG. 4B) parts, respectively. As the airgap increased from 1 cm to 5 cm, the voltage increased linearly from 2.2 to 14.2 V for the impact on the front side as well as from 5 to 17.8 V for the impact on the back side (FIG. 4C). As the airgap increases, the force due to the impact on the triboelectric surface also increases directly for the front side and indirectly for the back side. Since the frequency of tapping is kept constant, the velocity of the finger increases with increased airgap. So, the momentum increases with the increased velocity, resulting in a higher force of impact when the airgap increases. This magnified force leads to larger deformation of the contact surface of the triboelectric layers resulting in a higher contact surface area and a higher output voltage [74,80,81]. The output current also increased linearly with increasing airgap.

Figure 4D:
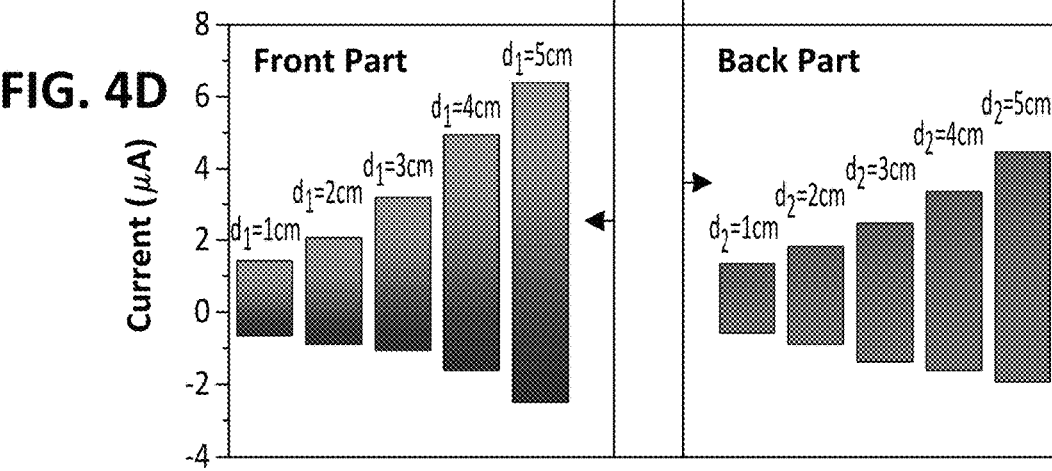

While the maximum output current was observed as 1.5 µA for the front part at 1 cm airgap, the output current increased to 6.4 µA at 5 cm airgap (FIG. 4D). Likewise, The output current increased from 1.3 to 4.5 µA for the back part (FIG. 4D). As discussed before, the velocity of the finger increases due to the increased airgap with constant frequency of impact. So, the kinetic energy on the triboelectric layer increases with the increase of velocity, which leads to a larger transfer of electrons through the triboelectric surfaces [74, 80]. As a result, electrons from the electrodes flow at a higher rate to neutralize the larger transfer of electrons of the triboelectric surfaces, which results in a higher output current.

Example 5: TESTEC Performance Variation When Tapping With Multiple Fingers

The output performance of TESTEC is demonstrated with the application of a "tapping" to the device, and demonstrates the effect of different amounts/intensity of tapping to a surface results in a variation in energy generating potential. In particular, "tapping" is compared between single finger tapping and multiple finger tapping.

The front part of the assembly in which the device was placed was tapped at a 3 cm airgap and 120 BPM frequency using different combination of fingertips. The volar section of the index, middle and ring fingers of both hands were used for this test. FIG. 4E demonstrates maximum peak to peak voltage outputs obtained for variable fingertip tapping combinations. The maximum peak to peak voltage using the index fingertip was 9.4 V.

As the middle finger was added with the index finger in applying a tapping to the surface of the assembly, the peak to peak voltage increased to 12.3 V. The surface area of the contact triboelectrification increased from 6.67 cm$^2$ to 13.84 cm$^2$ when the middle fingertip was added with the index finger. The higher surface area of the combined index and middle fingertip promoted higher triboelectric output. The highest peak to peak voltage was obtained for the combination of index, middle and ring fingertip of both hands 59.6 V. However, the output signal did not rise linearly due to the unequal surface area as well as the variation of impact of the fingers.

When the index finger of the left hand was added with the other three fingers (index, middle and ring fingers) of the right hand, the output signal increased exponentially as the index finger of the left hand created a higher impact when combined with the other three fingers of the right hand.

Example 6: TESTEC Performance With Different Electronic Components

The present example demonstrates the enhancement of energy output using a TESTEC component and/or assembly as disclosed.

First, the TESTEC output response was analyzed by integrating the TESTEC with a full wave bridge rectifier (FIG. 5A, 112, "Bridge Rectifier" (4 arrows square inset), FIG. 5D, 112 "Bridge Rectifier" (4 arrows square inset), FIG. 5D, 800 "C" (Capacitor). FIG. 5A demonstrates the equivalent circuit diagram for converting the AC power signal to DC signal. FIGS. 5B and 5C show the full wave rectified voltage signal obtained from tapping the front and back part of the device at 120 BPM frequency and 5 cm airgap, respectively. The maximum output rectified open circuit voltage was recorded as 10.6 and 14.8V for the front and back parts, respectively. Points 1 and 2 from FIG. 5B show the rectified output signal due to tapping and releasing on the front part respectively while points 3 and 4 from FIG. 5 show it for step down (press) and step up (release) motion operating the back part. The output signal from releasing operation is quicker for the front part compared to that of the back part because the direct contact and release of the front part results in a quicker separation between contact surfaces compared with the separation from the indirect contact and release of the back part.

After testing the device with the full bridge rectifier 112 (FIG. 5D, depicted as 4 arrows in a square configuration), the device was examined with a capacitor 800 (FIG. 5D, "C") to test the prospect of storing energy from the tapping and stepping motion as well as providing constant bias voltage to power touch-based electronic equipment [80,83]. FIGS. 5D and 5E demonstrate schematic and optical view of the equivalent circuit diagram where the device was integrated with a full bridge rectifier 112 (FIG. 5D) and a capacitor 800, (FIG. 5D, "C"). Capacitors of 0.1, 0.3, 1, 3.3 and 10 µF were used for the test at a 5 cm airgap. FIGS. 5F and 5G show the open circuit voltage for charging the capacitors for 60 s at 210 BPM frequency using the front and back part of the TESTEC, respectively. The higher the capacitance of the capacitor, the lower the rate of charging. For instance, the output voltage observed for a 0.1 µF capacitor was 7.7 V, while the output voltage for a 0.3 µF capacitor was 3.6 V after each was charged for 60 s using the front part. Similarly, the discharge rate was higher for the 0.1 µF capacitor. It took 145 s to discharge the 0.1 µF capacitor completely, where it took 302 s for the 0.3 µF capacitor to completely discharge (FIG. 5H). For the back part, the output voltage with the 0.1 and 0.3 capacitors µF was measured as 8.7 and 5.2 V, respectively. The 0.3 µF capacitor charges slower than the 0.1 µF capacitor due to the higher loss of charge in the 0.3 µF capacitor [80,83,84]. In addition, the output voltages of the front part for the 1, 3.3 and 10 µF capacitors were observed to be 0.78, 0.4 and 0.29 V respectively after charging the capacitors for 60 s. Likewise, the output voltage was 0.38, 0.49 and 0.25 V for the 1, 3.3 and 10 µF capacitors of the back part.

The effect of variable frequency was observed for charging and discharging the 0.1 µF capacitor with the front part of the TESTEC (FIG. 5H). The rate of charging at 210 BPM was higher than that at a frequency of 150 BPM. As the number of contacts is higher for a of 210 BPM frequency, larger number of charges transfer from the finger to the PET film during charging. Hence, a higher output voltage can be obtained, which results in a higher rate of charging. However, the discharge rate was observed to be lower for a frequency of 210 BPM in case of discharging. Due to the accumulation of higher voltage during the charging operation, it takes more time for discharging the capacitor at a 210 BPM tapping frequency. The energy conversion efficiency was measured based on the output energy from the capacitor test. The input energy was ideally considered to be the initial potential energy from the finger and the foot in 5 cm height. The maximum energy conversion for a 0.3 µF capacitor was calculated to be 57.4% for the front part and 4.46% for the back part. The direct impact on the PET layer from the finger resulted in a higher efficiency for the front part of the device. On the other hand, the back part was driven indirectly by the contact between the foot and the floor which resulted in an intermediate loss of energy and lower energy conversion efficiency.

The output power, voltage and current of the TESTEC were also characterized with external loads from $10^4$ to $10^8$ Ω for both parts. With the increase of the resistance, the output voltage rises while the output current decreases, following Ohm's law (FIGS. 5I and 5L). A sharp increase in the voltage can be observed from 0.25 to 0.5 MΩ resistance for the front and back parts, correspondingly. These output voltage and corresponding current measurements indicate there is a maximum power output at optimum resistance. FIGS. 5J and 5K show power measured for the front part and the back part, respectively. The corresponding maximum power obtained from the TESTEC was 12.1 mW (3.78 mW/m$^2$) at 0.46 MΩ for the front part and 33.56 mW (6.21 mW/m$^2$) at 1.02 MΩ for the back part.

Example 7: Powering Smart Electronics With TESTEC

Figure 6A:
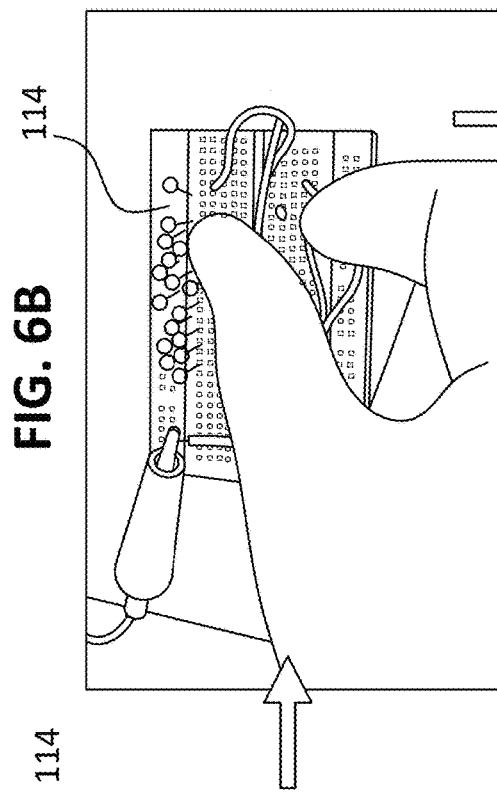
FIGS. 6A-6D; 6A—Circuit diagram for powering LEDs with TESTEC. 6B—Switch off mode of the circuit. 6C—Lighting 15 LEDs with the TESTEC. 6D—Proposed Circuit diagram for charging electronics (mobile phone). IC 7805 voltage regulator 80 regulates to 5V.
Figure 6B:
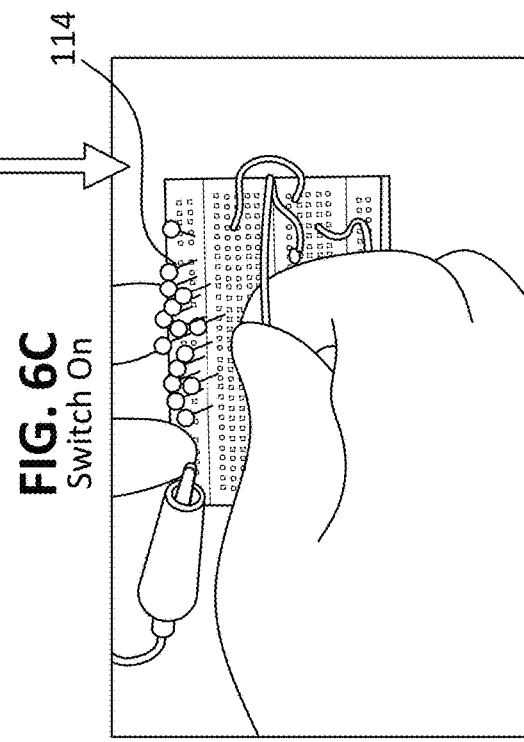
Figure 6C:
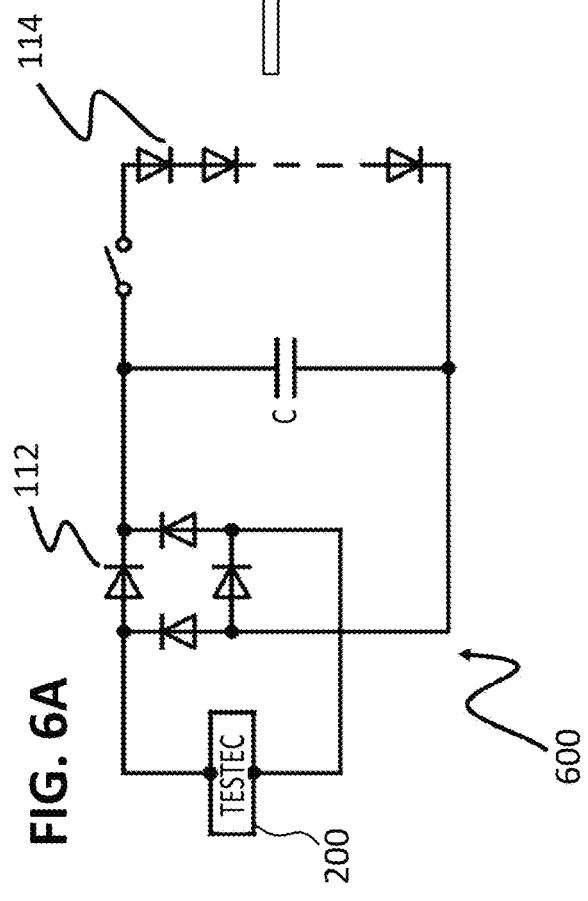

The TESTEC is demonstrated as suitable for lighting commercial Light Emitting Diodes (LED). FIG. 6A shows the equivalent circuit diagram for lighting commercial LEDs with TESTEC. A series of LEDs were attached with a capacitor 800 ("C") and a full bridge rectifier 112 (FIG. 5A, FIG. 5D, depicted as 4 (four) arrows in a square configuration). The front part of the TESTEC was switched off and tapped at 120 BPM frequency for 60 s (FIG. 6B). After switching on the circuit, 15 commercial LEDs were lightened with the TESTEC (FIG. 6C). The output of the LED test as well as the capacitor test magnify the applicability of use of the TESTEC for powering smart electronic devices.

Figure 6D:
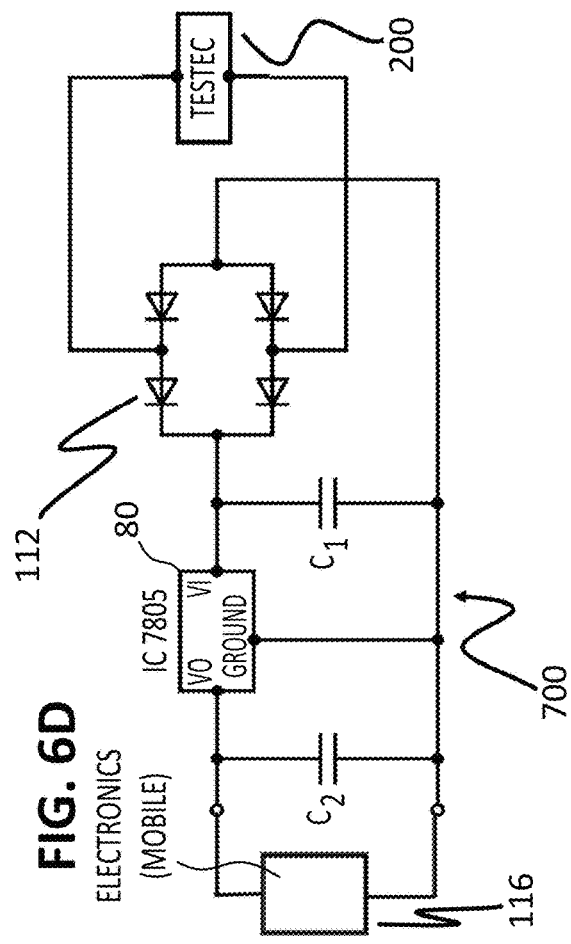

Many current smart phone models are powered by Li-ion batteries, which usually operate between 1.5 and 4.2 V [85,86]. The tapping and stepping motion can be applied to at least partially charge these batteries. An equivalent simple circuit diagram is proposed at FIG. 6D to charge smart electronics with TESTEC. An IC 7805 voltage regulator 80 can be used for regulating the voltage at 5 V. Two capacitors, C1 and C2, are used to remove AC ripples and maintain proper voltage supply at the output. Utilizing the tapping and stepping motion through the TESTEC will reduce energy loss, thus promoting sustainability while also optimizing the ability to supply power.

Example 8: Modification of TESTEC By Application of Ag Nanoparticles

The present example demonstrates an embodiment of the assembly that includes a modified polymeric film, such as a PET film that includes metal particles (nanoparticles, a nanoparticle layer and/or film) of silver or other metal.

To enhance performance of the TESTEC, Ag nanoparticles 38 were applied on the PET film. A very thin layer (10 nm) of Ag nanoparticles were sputtered on the PET film (FIG. 7A). Application of Ag nanoparticles on the PET film was found to provide a higher contact surface in triboelectric operation, compared with using only the PET film without the silver (metal) nanoparticles. Although Ag nanoparticles slightly affect the transparency of the PET layer, the PET layer functions as a base to hold the Ag layer. The mechanical properties of the PET can be sustained during the operation of TESTEC.

FIG. 7B shows the Scanning Electron Microscope (SEM) image of the PET layer sputtered with Ag nanoparticles. The image provides a clear view of Ag nanoparticles 100 on the PET film. The UV-Vis spectra was used for characterizing the optical properties of the Ag/PET film [89]. FIG. 7C shows the UV-Vis spectra of Ag particle-deposited PET film and commercial PET film. The maximum absorbance of the commercial PET film was observed at 266 nm wavelength. As seen in FIG. 7C, the PET film coated with Ag produced a spectra demonstrating a higher voltage absorbance with increasing wavelength when compared with the spectra for the PET film having no Ag nanoparticles. The inset of FIG. 7C 28/38 shows the optical view of the PET film, sputtered with Ag nanoparticles for the modified TESTEC.

The modified PET film with Ag nanoparticles was attached to the TESTEC for examining its triboelectric response and compared with the measured values of the plain PET surface as well. The modified TESTEC was tapped at 120 BPM with an airgap of 5 cm. The results showed a higher triboelectric response, that was attributed to the application of Ag nanoparticles. The modified PET film with Ag nanoparticles demonstrated a maximum rectified voltage of 17.1 V (FIG. 7D), while the plain PET surface only showed a voltage of 10.6 V (FIG. 7E). The maximum output current and power were increased by 2 µA and 68.1 mW for the modified TESTEC, respectively (FIGS. 7F and 7G).

The enhanced surface area of the modified TESTEC resulted in a higher output response due to the higher charge transfer in the surface. But, this enhancement was depleted as the triboelectric response was basically observed from the interaction between Ag and skin. Therefore, modification of the TESTEC with Ag nanoparticles scavenges more energy compared to the standard TESTEC without Ag nanoparticles.

A cost effective and adjustable energy case (TESTEC) is provided that comprises PET and NBR films, and provides for the harvest of mechanical energy through a uniquely configured itriboelectric assembly construct and mechanism. Embodiments of the invention are suitable for use with touch electronic devices, and powers them directly by touch, such as a tapping and/or stepping motion, such as that tapping or stepping motion that accompanies using or carrying an electronic device placed inside the assembly. The TESTEC successfully converts mechanical energy into electrical energy, where the output response by the device is increased linearly with increased frequency and airgap during tapping and/or stepping operation.

The maximum output voltages of the front and back parts were measured as 14.8 and 50.8 V, respectively. The output voltage raised up to 59.1 V when the front part was tapped with 6 fingers altogether. In addition, the TESTEC showed an excellent response when it was integrated with capacitors, resistors and a bridge. The TESTEC was successfully used for charging capacitors and driving commercial LEDs and bridge rectifiers, which further shows the ability of the TESTEC to convert mechanical energy to electrical energy.

The modification of the polymeric layers of the TESTEC with Ag nanoparticles resulted in an even higher, improved output response. The output power was increased by 68.1 mW due to the application of Ag nanoparticles on the TESTEC, which is about double the output power generated when Ag nanoparticles were not applied to the PET film.

The TESTEC can be modified to include other types of nanoparticles such as silver, gold, silicon, copper or any combination thereof. The front part of the TESTEC may use materials including polyurethane, tempered glass, and/or polypropylene, each of which may provide for improved power outputs.

In other embodiments, the TESTEC and its components may be oriented as an external component of the mobile devices itself. It can be manufactured as a compatible self-energy generator/charger for other smart devices such as iPad, tab, touch screen notebook, laptop, kiosk etc. In one example, where the TESTEC is employed with a kiosk, such as an airline check-in kiosk, grocery store kiosk, etc., an embodiment of the energy generating component of the invention is incorporated as an internal component, and does not require, a second TENG, or a "back" component of the energy generating device (present in other different embodiments described herein). By way of example, a touch screen of may be provided that is then implemented on the device itself (for example, a kiosk or a cell phone touchscreen, or a section of the original touchscreen). In this embodiment, the cell phone or other electronic device case would not include a separate touch screen. The mechanical energy ("tapping") at the touch screen is then used to generate electrical energy. This electrical energy is provided to the device, in this example a cell phone or kiosk. By way of example, a separate polymeric layer (transparent area) is incorporated as an add-on component of the electrical device itself, and is placed over the electrical device area that is the touch screen of the device (such as a peel-and-place polymeric layer placed over the entire touch screen or a portion of a cell phone touch screen). The assembly/case in this example would include a metal (such as a copper cover) having a first end and a second end. In this example, the first end of the metal (e.g., copper) cover will provide contact between the transparent polymeric piece/layer at the touch screen, and the second end of the copper cover would provide contact between the polymeric layer and the side area of the assembly. A back part would be included in this embodiment of the case, that could comprise a second triboelectric nanogenerator (TENG) 600, a rubber material layer 32 (such as a nitrile butadiene rubber (NBR) material, a copper film 30, and a spacer layer 34). Some embodiments need not include a second TENG, or a "back" part of the energy generating apparatus as it present with other embodiments.

The examples set forth above are provided to give those of ordinary skill in the art a complete disclosure and description of how to make and use the embodiments of the device described herein, and are not intended to limit the scope of what the inventors regard as the scope of the disclosure. Modifications of the above-described modes for carrying out the disclosure can be used by persons of skill in the art.

It is to be understood that the disclosure is not limited to particular devices, methods, or systems, which can, of course, vary. It is also to be understood that the terminology used herein is for the purpose of describing particular embodiments only, and is not intended to be limiting.

A number of embodiments of the disclosure have been described. Nevertheless, it will be understood that various modifications may be made without departing from the spirit and scope of the present disclosure.

The following references are specifically incorporated herein by reference in their entirety.

[1] E. Ozdalga, A. Ozdalga, N. Ahuja, The smartphone in medicine: a review of current and potential use among physicians and students, J. Med. Internet Res., 14 (2012), p. e128, 10.2196/jmir.1994.

[2] Technology in Our Life Today and How it Has Changed, AgingInPlace.org (2018) Updated for 2019, https://www.aginginplace.orgitechnology-in-our-life-today-and-how-it-has-changed/(accessed Aug. 26, 2019).

[3] A. R. Chowdhury, A. M. Abdullah, I. Hussain, J. Lopez, D. Cantu, S. K. Gupta, Y. Mao, S. Danti, M. J. 491 Uddin, Lithium doped zinc oxide based flexible piezoelectric-triboelectric hybrid nanogenerator, 492 Nano Energy, 61 (2019), pp. 327-336, 10.1016/j.iaanoen.2019.04.085.

[4] N. Espinosa, M. Hösel, D. Angmo, F. C. Krebs, Solar cells with one-day energy payback for the factories of the future, Energy Environ. Sci., 5 (2012), pp. 5117-5132, 10.1039/CH02728J.

[5] L. Lin, S. Wang, S. Niu, C. Liu, Y. Xie, Z. L. Wang, Noncontact free-rotating disk triboelectric nanogenerator as a sustainable energy harvester and self-powered mechanical sensor, ACS Appl. Mater. Interfaces, 6 (2014), pp. 3031-3038, 10.1021/am405637s

[6] M. S. Dresselhaus, I. L. Thomas, Alternative energy technologies, Nature, 414 (2001), pp. 332-337, 10.1038/35104599.

[7] E. Koçk, A. Şarkgünşi, The renewable energy and economic growth nexus in Black Sea and Balkan countries, Energy Pol., 100 (2017), pp. 51-57, 10.1016/j.enpol.2016.10.007

[8] A. M. Abdullah, A. R. Chowdhury, Y. Yang, H. Vasquez, H. J. Moore, J. G. Parsons, K. Lozano, J. J. Gutierrez, K. S. Martirosyan, M. J. Uddin, Tailoring the viscosity of water and ethylene glycol based TiO2 nanofluids, J. Mol. Liq., 297 (2020), p. 111982, 10.1016/j.mollig.2019.111982.

[9] M. Ma, Z. Kang, Q. Liao, Q. Zhang, F. Gao, X. Zhao, Z. Zhang, Y. Zhang, Development, applications, and future directions of triboelectric nanogenerators, Nano Res, 11 (2018), pp. 2951-2969, 10.1007/s12274-018-1997-9.

[10] F.-R. Fan, Z.-Q. Tian, 1 Lin Wang, Flexible triboelectric generator, Nanomater. Energy, 1 (2012), pp. 328-334, 10.1016/j.nanoen.2012.01.004.

[11] S. Wang, Z. L. Wang, Y. Yang, A One-Structure-Based Hybridized Nanogenerator for Scavenging Mechanical and Thermal Energies by Triboelectric-Piezoelectric-Pyroelectric Effects, Adv. Mater., 28 (2016), pp. 2881-2887, 10.1002/adma.201505684.

[12] A. R. Chowdhury, J. Jaksik, I. Hussain, R. Longoria, O. Faruque, F. Cesano, D. Scarano, J. Parsons, M. J. Uddin, Multicomponent nanostructured materials and interfaces for efficient piezoelectricity, Nano-Structures & Nano-Objects, 17 (2019), pp. 148-184, 10.1016/j.nanoso.2018.12.002.

[13] Y. Zi, L. Lin, J. Wang, S. Wang, J. Chen, X. Fan, P.-K. Yang, E Yi, Z. L. Wang, Triboelectric-pyroelectric-Piezoelectric hybrid cell for high-efficiency energy-harvesting and self-powered sensing, Adv. Mater., 27 (2015), pp. 2340-2347, 10.1002/adma.201500121.

[14] R. K. Gupta, Q. Shi, L. Dhakar, T. Wang, C. H. Heng, C. Lee, Broadband energy harvester using non-linear polymer spring and electromagnetic/triboelectric hybrid mechanism, Sci. Rep., 7 (2017), p. 41396, 10.1038/srep41396.

[15] A. R. Chowdhury, J. Jaksik, I. Hussain, P. Tran, S. Danti, M. J. Uddin, Surface modified nanostructured piezoelectric device as cost-effective transducer for energy and biomedicine, Energy Technol., 7 (1800767) (2019), 10.1002/ente.201800767.

[16] C. Wu, A. C. Wang, W. Ding, H. Guo, Z. L. Wang, Triboelectric nanogenerator: a foundation of the energy for the new era, Advanced Energy Materials, 9 (2019), p. 1802906, 10.1002/acnm.201802906.

[17] S. Wang, L. Lin, Z. L. Wang, Triboelectric nanogenerators as self-powered active sensors, Nanomater. Energy, 11 (2015), pp. 436-462, 10.1016/j.nanoen.2014.10.034

[18] F: R. Fan, Z.-Q. Tian, Z. Lin Wang, Flexible triboelectric generator, Nanomater. Energy, 1 (2012), pp. 328-334, 10.1016/j.nanoen.2012.01.004

[19] Z. L. Wang, J. Song, Piezoelectric Nanogenerators Based on Zinc Oxide Nanowire Arrays, Science, 312 (2006), pp. 242-246, 10.1126/science.1124005.

[20] F. Yi, L. Lin, S. Niu, P. K. Yang, Z. Wang, J. Chen, Y. Zhou, Y. Zi, J. Wang, Q. Liao, Y. Zhang, Z. L. Wang, Stretchable-rubber-based triboelectric nanogenerator and its application as self-powered body motion sensors, Adv. Funct. Mater., 25 (2015), pp. 3688-3696, 10.1002/adfm.201500428.

[21] E Hu, Q. Cai, E Liao, M. Shao, S.-T. Lee, Recent advancements in nanogenerators for energy harvesting, Small, 11 (2015), pp. 5611-5628, 10.1002/sml1.201501011.

[22] M. A. P. Mahmud, N. Huda, S. H. Farjana, M. Asadnia, C. Lang, Recent advances in nanogenerator-driven self-powered implantable biomedical devices, Advanced Energy Materials, 8 (2018), p. 1701210, 10.1002/aenm.201701210.

[23] Z. Lou, L. Li, L. Wang, G. Shen, Recent progress of self-powered sensing systems for wearable electronics, Small, 13 (2017), p. 1701791, 10.1002/sml1.201701791.

[24] Y. Zi, H. Guo, Z. Wen, M.-H. Yeh, C. Hu, Z. L. Wang, Harvesting low-frequency (<5 Hz) irregular mechanical energy: a possible killer application of triboelectric nanogenerator, ACS Nano, 10 (2016), pp. 4797-4805, 10.1021/acsnano.6b01569

[25] G. Zhu, Y. S. Zhou, P. Bai, X. S. Meng, Q. Jing, J. Chen, Z. L. Wang, A shape-adaptive thin-film-based approach for 50% high-efficiency energy generation through micro-grating sliding electrification, Adv. Mater., 26 (2014), pp. 3788-3796, 10.1002/adma.201400021.

[26] W. Tang, T. Jiang, F. R. Fan, A. F. Yu, C. Zhang, X. Cao, Z. L. Wang, Liquid-Metal Electrode for High Performance Triboelectric Nanogenerator at an Instantaneous Energy Conversion Efficiency of 70.6%, Advanced Functional Materials. 25 (2015) 3718-3725. https://doi.org/10.1002/adfm.201501331.

[27] E. Jovanov, A. Milenkovic, C. Otto, P. C. de Groen, A wireless body area network of intelligent motion sensors for computer assisted physical rehabilitation, J. NeuroEng. Rehabil., 2 (2005), p. 6, 10.1186/1743-0003-2-6.

[28] P.-J. (John), Hsu, Portable Cell Phone Battery Charger Using Solar Energy as the Primary Source of Power, U.S. Pat. No. 6,977,479B2, 2005. https://patents.google.com/patent/US6977479B2/en, (accessed Aug. 16, 2019).

[29] S. Niu, X. Wang, F. Yi, Y. S. Zhou, Z. L. Wang, A universal self-charging system driven by random biomechanical energy for sustainable operation of mobile electronics, Nat. Commun., 6 (2015), p. 8975, 10.1038/ncomms9975.

[30] Y. Wang, Y. Yang, Z. L. Wang, Triboelectric nanogenerators as flexible power sources, Npj Flexible Electronics, 1 (2017), p. 10, 10.1038/s41528-017-0007-8.

[31] Y. Mao, N. Zhang, Y. Tang, M. Wang, N I. Chao, E. Liang, A paper triboelectric nanogenerator for self-powered electronic systems, Nanoscale, 9 (2017), pp. 14499-14505, 10.1039/C7NR05222G.

[32] X. Pu, L. Li, H. Song, C. Du, Z. Zhao, C. Jiang, G. Cao, W. Hu, Z. L. Wang, A self-charging power unit by integration of a textile triboelectric nanogenerator and a flexible lithium-ion battery for wearable electronics, Adv. Mater., 27 (2015), pp. 2472-2478, 10.1002/adma.201500311.

[33] J. Wang, X. Li, Y. Zi, S. Wang, Z. Li, L. Zheng, F. Yi, S. Li, Z. L. Wang, A Flexible Fiber-Based Supercapacitor-Triboelectric-Nanogenerator Power System for Wearable Electronics, Advanced Materials. 27 (2015) 4830-4836. https://doi.org/10.1002/adma.201501934.

[34] W. Liu, Z. Wang, G. Wang, G. Liu, J. Chen, X. Pu, Y. Xi, X. Wang, H. Guo, C. Hu, Z. L. Wang, Integrated charge excitation triboelectric nanogenerator, Nat. Commun., 10 (2019), p. 1426, 10.1038/s41467-019-09464-8.

[35] X. Wang, B. Yang, J. Liu, Y. Zhu, C. Yang, Q. He, A flexible triboelectric-piezoelectric hybrid nanogenerator based on P(VDF-TrFE) nanofibers and PDMS/

MWCNT for wearable devices, Set Rep., 6 (2016), p. 36409, 10.1038/srep36409.

[36] J. Xiong, P. Cui, X. Chen, J. Wang, K. Panda, M.-F. Lin, P. S. Lee, Skin-touch-actuated textile-based triboelectric nanogenerator with black phosphorus fordurable biomechanical energy harvesting, Nat. Commun., 9 (2018), p. 4280, 10.1038/s41467-018-06759-0.

[37] G. Zhu, R Bai, J. Chen, Z. Lin Wang, Power-generating shoe insole based on triboelectric nanogenerators for self-powered consumer electronics, Nanomater. Energy, 2 (2013), pp. 688-692, 10.1016/j.nanoen.2013.08.002.

[38] Y. H. Ko, G. Nagaraju, S. H. Lee, J. S. Yu, PDMS-based triboelectric and transparent nanogenerators with ZnO nanorod arrays, ACS Appl. Mater. Interfaces, 6 (2014), pp. 6631-6637, 10.1021/arn5018072.

[39] Q. Liang, X. Yan, Y. Gu, K. Zhang, M. Liang, S. Lu, X. Zheng, Y. Zhang, Highly transparent triboelectric nanogenerator for harvesting water-related energy reinforced by antireflection coating, Sci. Rep., 5 (2015), p. 9080, 10.1038/srep09080.

[40] Transparent Flexible Graphene Triboelectric Nanogenerators-Kim-2014-Advanced Materials-Wiley Online Library, (n.d.)., https://onlinelibrary.wiley.com/doi/fii11/10.1002/adma.201400172 (accessed Jul. 26, 2019).

[41] K. Y. Lee, M. K. Gupta, S.-W. Kim, Transparent flexible stretchable piezoelectric and triboelectric nanogenerators for powering portable electronics, Nano Energy. 14 (2015) 139-160. https://doi.org/10.1016/j.nanoen.2014.11.009.

[42] Y. Hwan Ko, S. Hyun Lee, J. Woo Leem, J. Su Yu, High transparency and triboelectric charge generation properties of nano-patterned PDMS, RSC Adv., 4 (2014), pp. 1021640220, 10.1039/C3RA47199C.

[43] B. N. Chandrashekar, B. Deng, A. S. Smitha, Y. Chen, C. Tan, H. Zhang, H. Peng, Z. Liu Roll-to-Roll green transfer of CVD graphene onto plastic for a transparent and flexible triboelectric nanogenerator, Adv. Mater., 27 (2015), pp. 5210-5216, 10.1002/adma.201502560.

[44] H. Guo, Q. Leng, X. He, M. Wang, J. Chen, Q. Hu, Y. Xi, A triboelectric generator based on checker-like interdigital electrodes with a sandwiched PET thin film for harvesting sliding energy in all directions, Advanced Energy Materials, 5 (2015), p. 1400790, 10.1002/aenm.201400790.

[45] N. Kaur, J. Bahadur, V. Panwar, P. Singh, K. Rathi, K. Pal, Effective energy harvesting from a single electrode based triboelectric nanogenerator, Sci. Rep., 6 (2016), p. 38835, 10.1038/srep38835.

[46] Z. L. Wang, L. Lin, J. Chen, S. Niu, Y. Zi, Triboelectric nanogenerator: single-electrode mode, Z. L. Wang, L. Lin, J. Chen, S. Niu, Y. Zi (Eds.), Triboelectric Nanogenerators, Springer International Publishing, Cham (2016), pp. 91-107, 10.1007/978-3-319-40039-6_4.

[47] S. W. Chen, X. Cao, N. Wang, L. Ma, H. R. Zhu, M. Willander, Y. Jie, Z. L. Wang, An ultrathin flexible single-electrode triboelectric-nanogenerator for mechanical energy harvesting and instantaneous force sensing, Advanced Energy Materials, 7 (2017), p. 1601255, 10.1002/aenm.201601255.

[48] K. Panda, V. Kumar, W. Jiangxin, V. Bhavanasi, R. Bendi, P. S. Lee, Highly transparent, stretchable, and self-healing ionic-skin triboelectric nanogenerators for energy harvesting and touch applications, Advanced Materials. 29 (2017) 1702181. https://doi.org/10.1002/adma.201702181.

[49] X. Wang, Y. Yin, F. Yi, K. Dai, S. Niu, Y. Han, Y. Zhang, Z. You, Bioinspired stretchable triboelectric nanogenerator as energy-harvesting skin for self-powered electronics, Nanomater. Energy, 39 (2017), pp. 429-436, 10.1016/j.nanoen.2017.07.022.

[50] Y. Yang, H. Zhang, Z.-H. Lin, Y. S. Zhou, Q. Jing, Y. Su, J. Yang, J. Chen, C. Hu, Z. L. Wang, Human skin based triboelectric nanogenerators for harvesting biomechanical energy and as self-powered active tactile sensor system, ACS Nano, 7 (2013), pp. 9213-9222, 10.1021/nn403838y.

[51] T. Huang, C. Wang, H. Yu, H. Wang, Q. Zhang, M. Zhu, Human walking-driven wearable all-fiber triboelectric nanogenerator containing electrospun polyvinylidene fluoride piezoelectric nanofibers, Nanomater. Energy, 14 (2015), pp. 226-235, 10.1016/j.nanoen.2015.01.038.

[52] W. Yang, J. Chen, G. Zhu, J. Yang, P. Bai, Y. Su, Q. Jing, X. Cao, Z. L. Wang, Harvesting energy from the natural vibration of human walking, ACS Nano, 7 (2013), pp. 11317-11324, 10.1021/tm405175z.

[53] Y. Zi, J. Wang, S. Wang, S. Li, Z. Wen, H. Guo, Z. L. Wang, Effective energy storage from a triboelectric nanogenerator, Nat. Commun., 7 (2016), p. 10987, I 0.1038/ncomms10987.

[54] The Triboelectric Series-AlphaLab, Inc, AlphaLab, Inc. (n.d.)., https://www.alphalabinc.com/triboelectric-series/(accessed Feb. 25, 2019).

[55] S. Rathore, S. Sharma, B. P. Swain, R. K. Ghadai, A critical review on triboelectric nanogenerator, TOP Conf. Ser. Mater. Sci. Eng., 377 (2018), Article 012186, 10.1088/1757-899X/377/1/012186.

[56] A. F. Diaz, R. M. Felix-Navarro, A semi-quantitative tribo-electric series for polymeric materials: the influence of chemical structure and properties, Journal of Electrostatics. 62 (2004) 277-290. 649 https://doi.org/10.1016/j.elstat.2004.05.005.

[57] H. Zou, Y. Zhang, L. Guo, P. Wang, X. He, G. Dai, H. Zheng, C. Chen, A. C. Wang, C. Xu, Z. L. Wang, Quantifying the triboelectric series, Nat. Commun., 10 (2019), pp. 1-9, 10.1038/s41467-019-09461-x.

[58] H.-J. Yoon, H. Ryu, S.-W. Kim, Sustainable powering triboelectric nanogenerators: approaches and the path towards efficient use, Nanomater. Energy, 51 (2018), pp. 270-285, 10.1016/j.nanoen.2018.06.075.

[59] W. Du, X. Han, L. Lin, M. Chen, X. Li, C. Pan, Z. L. Wang, A three dimensional multi-layered sliding triboelectric nanogenerator, Advanced Energy Materials, 4 (2014), p. 1301592, 10.1002/aeum.201301592.

[60] X. Pu, M. Liu, X. Chen, J. Sun, C. Du, Y. Zhang, J. Thai, W. Hu, Z. L. Wang, Ultrastretchable, transparent triboelectric nanogenerator as electronic skin for biomechanical energy harvesting and tactile sensing, Science Advances, 3 (2017), Article e170001.5, 1.0.1.1.26/sciadv.1700015.

[61] Dscout Research: People Touch Cellphones 2,617 Times a Day-Business Insider, (n.d.),https://www.businessinsider.com/dscout-research-people-touch-cell-phones-2617-times-a-day-2016-7 (accessed Jul. 18, 2019).

[62] C. B. Crawford, B. Quinn, 4-physiochemical properties and degradation, C. B. Crawford, B. Quinn (Eds.), Microplastic Pollutants, Elsevier (2017), pp. 57-100, 10.1016/B978-01 2-809406-8.00004-9.

[63] M. Leonhard, J. Lin, S. Huang, Touch Screen Protector, U.S. Pat. No. 8,044,942B1 (2011), https://patents.google.com/patent/US8044942B1/en (accessed Jul. 21, 2019).

[64] J. Y. Lee, Y. S. Oh, H. J. PARK, S. H. Kim, Large-size touch screen, US20110216020A1, (2011) https://patents.google.com/patent/US20110216020A1/en (accessed Jul. 21, 2019).

[65] H.-C. Hsieh, J.-Y. Chen, W.-Y. Lee, D. Bera, W.-C. Chen, Stretchable fluorescent polyfluorene/acrylonitrile butadiene rubber blend electrospun fibers through physical interaction and geometrical confinement, Macromol. Rapid Commun., 39 (2018), p. 1700616, 10.1002/marc.201700616.

[66] T. Yasin, S. Ahmed, M. Ahmed, F. Yoshii, Effect of concentration of polyfunctional monomers on physical properties of acrylonitrile-butadiene rubber under electron-beam irradiation, Radiat. Phys. Chem., 73 (2005), pp. 155-158, 10.1016/jradphyschern.2004.07.009.

[67] J.-M. Andanson, S. G. Kazarian, In situ ATR-FTIR spectroscopy of poly(ethylene terephthalate) subjected to high-temperature methanol, Macromol. Symp., 265 (2008), pp. 195-204, 10.1002/masy.200850521.

[68] M. Mecozzi, L. Nisini, The differentiation of biodegradable and non-biodegradable polyethylene terephthalate (PET) samples by FTIR spectroscopy: a potential support for the structural differentiation of PET in environmental analysis, Infrared Phys. Technol., 101 (2019), pp. 119-126, 10.1016/1.infrared.2019.06.008.

[69] K. Elnagar, T./thou Elmaaty, S. Raouf, Dyeing of polyester and polyamide synthetic fabrics with natural dyes using ecofriendly technique, Journal of Textiles (2014), 10.11.55/2014/363079.

[70] A. a. M. El-Saftawy, Regulating the Performance Parameters of Accelerated Particles, (2013), http://in-islaea.org/Search/search.aspx?orig_q=RN:46135147 (accessed Jul. 21, 2019).

[71] S. Samantarai, A. Nag, N. Singh, D. Dash, A. Basak, G. B. Nando, N. C. Das, Chemical modification of nitrile rubber in the latex stage by functionalizing phosphorylated cardanol prepolymer: a bio-based plasticizer and a renewable resource, J. Elastomers Plastics, 51 (2019), pp. 99-129, 10.1177/0095244318768644

[72] A. Alhareb, H. Akil, Z. Ahmad, Poly(methyl methacrylate) denture base composites enhancement by various combinations of nitrile butadiene rubber/treated ceramic fillers, J. Thermoplast. Compos. Mater., 30 (2017), pp. 1069-1090, 10.1177/0892705715616856.

[73] Y. Zou, P. Tan, B. Shi, H. Ouyang, D. Jiang, Z. Liu, H. Li, M. Yu, C. Wang, X. Qu, L. Zhao, Y. Fan, Z. L. Wang, Z. Li, A bionic stretchable nanogenerator for underwater sensing and energy harvesting, Nat. Commun., 10 (2019), p. 2695, 1.0.1038/s41467-019-10433-4.

[74] L. Gu, N. Cui, L. Cheng, Q. Xu, S. Bai, M. Yuan, W. Wu, J. Liu, Y. Zhao, F. Ma, Y. Qin, Z. L. Wang, Flexible fiber nanogenerator with 209 V output voltage directly powers a light-emitting diode, Nano Lett., 13 (2013), pp. 91-94, 10.1021/n1303539c

[75] X. Wang, B. Yang, J. Liu, Y. Zhu, C. Yang, Q. He, A flexible triboelectric-piezoelectric hybrid nanogenerator based on P(VDE-TrFE) nanofibers and PDMS/MWCNT for wearable devices, Sci. Rep., 6 (2016), p. 36409, 10.1038/srep36409

[76] M. Murai, H.-R. Lau, B. P. Pereira, R. W. H. Pho, A cadaver study on volume and surface area of the fingertip, J. Hand Surg., 22 (1997), pp. 935-941, 10.1016/50363-5023 (97) 80094-9.

[77] K. Panda, G. Thangavel, G. Cai, X. Zhou, S. Park, J. Xiong, P. S. Lee, Extremely stretchable and self-healing conductor based on thermoplastic elastomer for all-three-dimensional printed triboelectric nanogenerator, Nat. Commun., 10 (2019), p. 2158, 10.1038/s41467-019-10061-y.

[78] C. Ramon, P. Garguilo, E. A. Fridgeirsson, J. Haueisen, Changes in scalp potentials and spatial smoothing effects of inclusion of dura layer in human head models for EEG simulations, Front. Neuroeng., 7 (2014), 10.3389/fneng.2014.00032.

[79] A. Boonbumrung, P. Sae-oui, C. Sirisinha, Reinforcement of multiwalled carbon nanotube in nitrile rubber: in Comparison with carbon black, conductive carbon black, and precipitated silica, J. Nanomater. (2016), 10.1155/2016/6391572.

[80] Y. Zhu, B. Yang, J. Liu, X. Wang, L. Wang, X. Chen, C. Yang, A flexible and biocompatible triboelectric nanogenerator with tunable internal resistance for powering wearable devices, Sci. Rep., 6 (2016), p. 22233, 10.1038/srep22233.

[81] G. Hassan, E. Khan, A. Hassan, S. Ali, J. Bae, C. H. Lee, A flat-panel-shaped hybrid piezo/triboelectric nanogenerator for ambient energy harvesting, Nanotechnology, 28 (2017), p. 175402, 10.1088/1.361-6528/aa65c3.

[82] H. Zhang, Y. Yang, T.-C. Hou, Y. Su, C. Hu, Z. L. Wang, Triboelectric nanogenerator built inside clothes for self-powered glucose biosensors, Nanomater. Energy, 2 (2013), pp. 1019-1024, 10.1016/j.nanoen.2013.03.024.

[83] D. Yoo, E. Y. Go, D. Choi, J.-W. Lee, I. Song, J.-Y. Sim, W. Hwang, D. S. Kim, Increased interfacial area between dielectric layer and electrode of triboelectric nanogenerator toward robustness and boosted energy output, Nanomaterials, 9 (2019), p. 71, 10.3390/nano9010071.

[84] C. Cui, X. Wang, Z. Yi, B. Yang, X. Wang, X. Chen, J. Liu, C. Yang, Flexible single-electrode triboelectric nanogenerator and body moving sensor based on porous Na2CO3/polydimethylsiloxane film, ACS Appl. Mater. Interfaces, 10 (2018), pp. 3652-3659, 10.102$^{1}$/$_a$csami.7b17585.

[85] X. Hu, S. Li, H. Peng, A comparative study of equivalent circuit models for Li-ion batteries, Journal of Power Sources. 198 (2012) 359-367. https://doi.org/10.1016/j.jpowsour.2011.10.013.

[86] L. Lu, X. Han, J. Li, J. Hua, M. Ouyang, A review on the key issues for lithium-ion battery management in electric vehicles, J. Power Sources, 226 (2013), pp. 272-288, 10.1016Thpowsour.2012.10.060.

[87] E. R. Delay, A. J. Golden, N. O. Steiner, A compact IC tone generator, Physiol. Behay., 21 (1978), pp. 133-134, 10.1016/0031-9384(78)90288-3.

[88] G. Zhu, Z.-H. Lin, Q. Jing, P. Bai, C. Pan, Y. Yang, Y. Zhou, Z. L. Wang, Toward large-scale energy harvesting by a nanoparticle-enhanced triboelectric nanogenerator, Nano Lett., 13 (2013), pp. 847-853, 10.1021/n14001053.

[89] M. Tsuji, S. Hikino, R. Tanabe, Y. Sano, Synthesis of bicompartmental Ag/Cu nanoparticles using a two-step polyol process, Chem. Lett., 38 (2009), pp. 860-861, 10.1246/c12009.860.

[90] T. Shen, Y. Liu, Y. Zhu, D.-Q. Yang, E. Sacher, Improved adhesion of Ag NPs to the polyethylene terephthalate surface via atmospheric plasma treatment and surface functionalization, Appl. Surf Sci., 411 (2017), pp. 411-418, 10.1016/j.apsusc.2017.03.149

[91] J. A. Adekoya, E. O. Dare, M. A. Mesubi, Tunable morphological properties of silver enriched platinum allied nanoparticles and their catalysed reduction of p-nitrophenol, Adv. Nat. Sci. Nanosci. Nanotechnol., 5 (2014), Article 035007, 10.1088/2043-6262/5/3/035007.

What is claimed is:

1. A triboelectricity powered electronic device assembly comprising a front part (200), a metal cover (50) and a back part (400), wherein:
    the front part (200) comprises:
        a first triboelectric nanogenerator (TENG) (550), said first TENG comprising a single electrode TENG; and
    the metal cover (50) comprises a first end (90) and a second end (95), wherein the first end (90) is attached to the front part (200) of the assembly or a polymeric layer placed on a touch pad suitable for receiving a tapping mechanical input; and
    the back part 400 comprises a second triboelectric nanogenerator (TENG) (600), a rubber material layer (32), a polymeric layer (28), a metal film (30) and a spacer layer (34),
wherein the metal film (30) is placed in the center of the back part (400) and is in communication with the metal cover (50),
the polymeric layer (28) of the back part is placed over the metal film (30), and the spacer layer (34) is located between the rubber material layer (32) and the polymeric layer (28) of the back part,
wherein outside contact with the polymeric layer (28) of the first part covering the touch screen receives mechanical energy, said first TENG (550) generating electrical energy from said mechanical energy, said electrical energy being delivered to an electronic device placed in the assembly, and wherein frictional contact between the layers of the back part (400) produces motion generated energy, and the second TENG (600) generates electrical energy from said motion generated energy, said electrical energy being delivered to an electronic device placed in the assembly.

2. The triboelectricity powered electronic device assembly of claim 1, wherein the polymeric layer (28) of the front part comprises a film layer of polyethylene terephthalate (PET).

3. The triboelectricity powered electronic device assembly of claim 1, wherein the polymeric layer of the front part comprises gold, silver, silicon, copper, or any combination of gold, silver, silicon, or copper particles.

4. The triboelectricity powered electronic device assembly of claim 1, further defined as a stepping and tapping initiated triboelectricity powered assembly.

5. The triboelectricity powered electronic device assembly of claim 1, further defined as a cell phone case, an iPhone™ case, an iPad™ case, or an energy generator component for a touch screen operated device kiosk.

6. The triboelectricity powered electronic device assembly of claim 3, wherein the polymeric layer of the front part comprises a polyethylene terephthalate (PET) film with silver nanoparticles.

7. The triboelectricity powered electronic device assembly of claim 1, wherein the spacer layer (34) between the polymeric layer of the back part comprising a polyethylene terephthalate (PET) film, and the NBR layer provides an air gap, and comprises a rectangular-shaped spacer foam.

8. A triboelectricity powered case or carrier for an electronic device or touch screen operated device, comprising:
    a front part (200), a side area (300), and a back part (400), wherein:
        the front part (200) comprises a first triboelectric nanogenerator (TENG) (550), said first TENG comprising a single electrode TENG, a durable polymeric layer (28), said polymeric layer (28) being in the form of a film and comprising a transparent area configured to cover a touch screen of an electronic device,
        the side area (300) comprises a copper cover (50) and a polymeric layer (28), wherein said side area is configured to conform with a side of an electronic device, and the copper cover (50) comprises a first end (90) and a second end (95), wherein the first end (90) is attached to the transparent area of the polymeric layer (28) as a film, and the second end (95) is configured to cover the side area (300) of the electronic device, and
        the back part (400) comprise a second triboelectric nanogenerator (TENG) (600), a rubber material layer (32), a polymeric layer (28), a metal film (30) and a spacer layer (34), and the metal film (30) is placed in the center of the back part and is in communication with the metal cover (50) of the side area, the polymeric layer of the back part is placed over the metal film (30), and the spacer layer (34) is between the rubber material layer (32) and the polymeric layer (28) of the back part,
wherein contact with the transparent area of the polymeric layer (28) generates mechanical energy, said first TENG generates electrical energy from said mechanical energy, and said electrical energy is delivered to the electronic device placed in the case or carrier, and
wherein frictional contact between the layers of the back part (400) produces motion generated energy, and the second TENG (600) generates electrical energy from said motion generated energy, said electrical energy being delivered to an electronic device placed in the case or carrier.

9. The triboelectricity powered component of claim 8, wherein the polymeric layer (28) of the front part comprises a polyethylene terephthalate (PET) film, and wherein the PET film comprises gold, silver, silicon, copper, or any combination of gold, silver, silicon, or copper particles.

10. The triboelectricity powered component of claim 9, wherein the PET film comprises silver nanoparticles.

11. An internally integrated triboelectricity powered electronic device assembly for an electronic device, the assembly comprising:
    a front part (200) comprising
        a first triboelectric nanogenerator (TENG) (550), said first TENG comprising a single electrode TENG; and
        a durable polymeric film (28); and
    a side area (300) comprising a metal component (50) and a polymeric layer (28), wherein said metal component (50) comprises a first end (90) and a second end (95), wherein the first end (90) is attached to a transparent area of the polymeric film (28).

12. The triboelectricity powered electronic device assembly of claim 11, wherein the polymeric film comprises PET.

13. The triboelectricity powered electronic device assembly of claim 11, further defined as a stepping and tapping initiated triboelectricity powered assembly.

14. The triboelectricity powered electronic device assembly of claim 12, wherein the polymeric layer comprises a PET film, and wherein the PET film comprises silver nanoparticles.

15. The triboelectricity powered energy generating component of claim 11 further comprising an energy storage component, wherein said energy storage component comprises a capacitor (800).

16. The triboelectricity powered energy generating component of claim 15 wherein the energy storage component comprises a bridge rectifier (112).

* * * * *